(12) United States Patent
Yoshioka et al.

(10) Patent No.: US 9,932,924 B2
(45) Date of Patent: Apr. 3, 2018

(54) ABNORMALITY DIAGNOSIS DEVICE FOR BLOW-BY GAS RETURNING APPARATUS

(71) Applicant: AISAN KOGYO KABUSHIKI KAISHA, Obu-shi, Aichi-ken (JP)

(72) Inventors: Mamoru Yoshioka, Nagoya (JP); Shinji Kawai, Gifu (JP); Makoto Fukui, Nagoya (JP); Kasumi Mishima, Toyoake (JP); Hirokazu Tashita, Miyoshi (JP); Tsutomu Kuniyoshi, Tokai (JP); Kensuke Hiroi, Nagoya (JP)

(73) Assignee: AISAN KOBYO KABUSHIKI KAISHA, Obu (JP)

( * ) Notice: Subject to any disclaimer, the term of this patent is extended or adjusted under 35 U.S.C. 154(b) by 9 days.

(21) Appl. No.: 15/363,578

(22) Filed: Nov. 29, 2016

(65) Prior Publication Data
US 2017/0175662 A1 Jun. 22, 2017

(30) Foreign Application Priority Data

Dec. 17, 2015 (JP) .................................. 2015-246068
Aug. 5, 2016 (JP) .................................. 2016-154137

(51) Int. Cl.
*F02B 25/06* (2006.01)
*F02D 41/22* (2006.01)
(Continued)

(52) U.S. Cl.
CPC ............. *F02D 41/22* (2013.01); *F02M 25/06* (2013.01); *F01M 2013/0044* (2013.01);
(Continued)

(58) Field of Classification Search
CPC .. F01M 13/023; F01M 13/00; F01M 13/0011; F01M 13/028; F01M 2013/0038;
(Continued)

(56) References Cited

U.S. PATENT DOCUMENTS

| 2009/0211545 A1* | 8/2009 | Satou .................. F01M 13/0011 123/41.86 |
| 2009/0235907 A1* | 9/2009 | Satou .................. F01M 13/0011 123/574 |

(Continued)

FOREIGN PATENT DOCUMENTS

| JP | H01-61414 U | 4/1989 |
| JP | H05-163993 A | 6/1993 |

(Continued)

*Primary Examiner* — Marguerite McMahon
*Assistant Examiner* — Tea Holbrook
(74) *Attorney, Agent, or Firm* — Oliff PLC

(57) ABSTRACT

A blow-by gas returning (BGV) apparatus includes a blow-by gas storage unit, a throttle device placed in an intake passage, a BGV passage for allowing blow-by gas to flow to the intake passage downstream of the throttle device for recirculation, and a PCV valve for regulating a flow rate of blow-by gas. An abnormality diagnosis device includes an air flow meter to detect an intake amount in the intake passage upstream of the throttle device and an electronic control unit (ECU) for diagnosis. The ECU controls the PCV valve to a first opening degree and a second opening degree when an engine is during deceleration fuel cut, and diagnoses abnormality of the BGV apparatus based on a first intake amount detected under control with the first opening degree and a second intake amount detected under control with the second opening degree.

13 Claims, 19 Drawing Sheets

(51) Int. Cl.
*F02M 25/06* (2016.01)
*F02D 41/12* (2006.01)
*F02D 41/18* (2006.01)
*F01M 13/00* (2006.01)

(52) U.S. Cl.
CPC ............ *F02D 41/123* (2013.01); *F02D 41/18* (2013.01); *F02D 2250/08* (2013.01)

(58) Field of Classification Search
CPC ............ F01M 2013/0077; F01M 1/18; F01M 2013/0083; F02D 2250/08; F02D 41/123; F02D 2200/0612; F02D 41/003; F02D 41/144; F02D 41/005; F02D 2009/022; F02D 41/02; F02D 2250/00; F02D 41/18; F02D 41/22
USPC ...................................... 123/572–574, 41.86
See application file for complete search history.

(56) References Cited

U.S. PATENT DOCUMENTS

2015/0040878 A1\* 2/2015 Yoshioka ........... F01M 13/0011
123/574
2016/0348614 A1\* 12/2016 Dudar ................ F02M 25/0809
2017/0342927 A1\* 11/2017 Miyamoto .......... F02D 41/1495

FOREIGN PATENT DOCUMENTS

JP        2007-002838 A        1/2007
JP        2009-197676 A        9/2009

\* cited by examiner

ABNORMALITY DIAGNOSIS DEVICE FOR BLOW-BY GAS RETURNING APPARATUS

CROSS-REFERENCE TO RELATED APPLICATIONS

This application is based upon and claims the benefit of priority from each of the prior Japanese Patent Application No. 2015-246068 filed on Dec. 17, 2015, and Japanese Patent Application No. 2016-154137 filed on Aug. 5, 2016 the entire contents of which are incorporated herein by reference.

BACKGROUND

Technical Field

The present invention relates to a blow-by gas returning apparatus for allowing blow-by gas generated in an engine to flow in an intake passage and return to the engine and, more particularly, to an abnormality diagnosis device configured to diagnose an abnormality of the returning apparatus.

Related Art

Conventionally, there is known, as one example of techniques of the above type, an abnormality diagnosis device for a blow-by gas returning apparatus disclosed in Japanese unexamined patent application publication No. 2009-197676 ("JP-A-2009-197676"). This blow-by gas returning apparatus (Blowby Gas Ventilation Apparatus, which is hereinafter referred to as a "BGV apparatus") includes a PCV passage (a blow-by gas returning passage) for introducing blow-by gas to a part of an intake passage, located downstream of a throttle valve, and a PCV valve for regulating a flow rate of the blow-by gas in this passage. This abnormality diagnosis device is configured to diagnose whether an abnormality has occurred in at least one of the PCV passage and the PCV valve. Specifically, when the amount of intake air drawn into the engine during ISC control (i.e., during control of an idle rotation speed to a target value) reaches a predetermined amount and no abnormality has not occurred in the BGV apparatus, the abnormality diagnosis device sets, as a first operating state, an engine operating state in which an opening degree of the PCV valve is kept at a first opening degree, and further sets, as a second operating state, an engine operating state in which the opening degree of the PCV valve is kept at a second opening degree different from the first opening degree. The abnormality diagnosis device is configured to determine that an abnormality has occurred in the blow-by gas returning apparatus when a difference between a control amount of the throttle valve under the first operating state set as an actual operating state and a control amount of the throttle valve under the second operating state as the actual operating state during execution of ISC control is equal to or less than a reference value.

SUMMARY

Technical Problems

However, the abnormality diagnosis device disclosed in JP-A-2009-197676 changes the opening degree of the PCV valve to the first opening degree and the second opening degree during the ISC control and, based on a correction value of the intake amount by the throttle valve, checks an abnormality of the BGV apparatus. Herein, the opening degree of the PCV valve could not be so largely changed originally for control of the idle rotation speed to the target value, so that a blow-by gas flow rate less changes, resulting in a narrow range of abnormality determination. Thus, a flow-rate change needed for determination of a perforation abnormality, such as variously-sized holes penetrated in a pipe forming the PCV passage, could not be obtained. Further, for enhancing the accuracy of the abnormality determination, it is necessary to take some time to execute the determination.

The present invention has been made in view of the aforementioned circumstances and has a purpose to provide an abnormality diagnosis device for a blow-by gas returning apparatus, configured to enable accurate diagnosis of a perforation abnormality of the blow-by gas returning apparatus.

Means of Solving the Problem

To achieve the above purpose, one aspect of the invention provides an abnormality diagnosis device for diagnosing an abnormality of a blow-by gas returning apparatus configured to allow blow-by gas generated in an engine to flow to an intake passage and return to the engine, the engine being configured to generate drive power when receiving supply of fuel, the supply of fuel being shut off during deceleration, the blow-by gas returning apparatus comprising: a blow-by gas storage unit configured to store blow-by gas generated in the engine; an intake amount regulating valve provided in the intake passage and configured to regulate an amount of intake air flowing in the intake passage; a blow-by gas returning passage configured to allow blow-by gas stored in the blow-by gas storage unit to flow in the intake passage downstream of the intake amount regulating valve and return to the engine; and a gas flow regulating unit configured to have a variable opening degree to regulate a flow rate of blow-by gas in the blow-by gas returning passage, wherein the abnormality diagnosis device comprises: an intake amount detecting unit placed in the intake passage upstream of the intake amount regulating valve and configured to detect an amount of intake air; and an abnormality diagnosis unit configured to diagnose abnormality of the blow-by gas returning apparatus, wherein the abnormality diagnosis unit is configured to: control the gas flow regulating unit to a first opening degree and a second opening degree that is larger than the first opening degree, when the engine is during deceleration and the supply of fuel to the engine is shut off, and diagnose the abnormality of the blow-by gas returning apparatus based on a first intake amount detected by the intake amount detecting unit when the gas flow regulating unit is controlled to the first opening degree and a second intake amount detected by the intake amount detecting unit when the gas flow regulating unit is controlled to the second opening degree.

Advantageous Effects

The invention configured as above enables accurate diagnosis of a perforation abnormality in a relatively short time.

DESCRIPTION OF EMBODIMENTS

First Embodiment

A detailed description of a preferred embodiment of an abnormality diagnosis device for a blow-by gas returning apparatus (hereinafter, referred to as a "BGV apparatus") embodying the present invention will now be given referring to the accompanying drawings.

Figure 1:
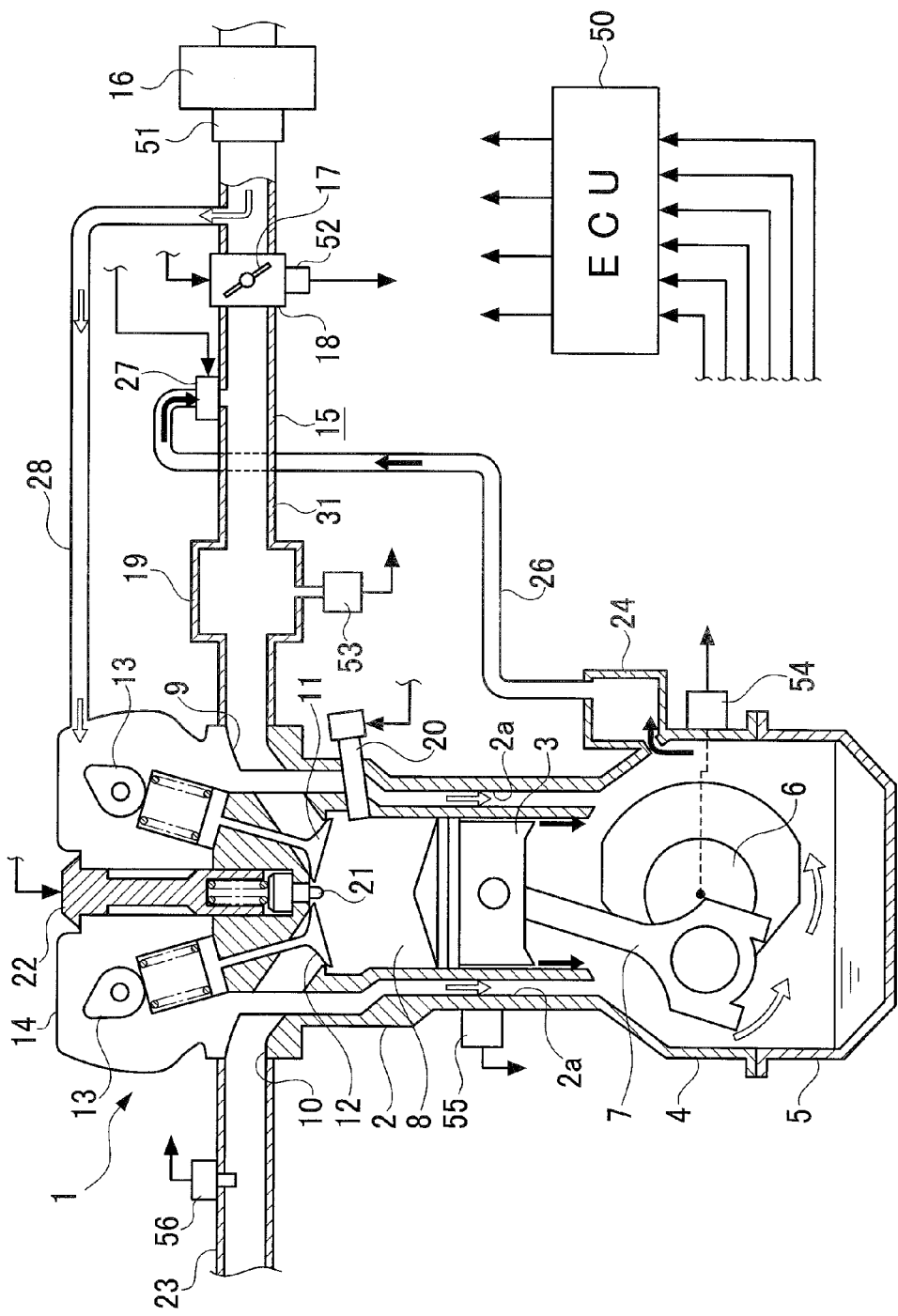
FIG. 1 is a schematic configuration diagram of a gasoline engine system in a first embodiment.

FIG. 1 is a schematic configuration diagram of a gasoline engine system in the present embodiment. An engine 1 constituting this engine system is provided with an engine block 2 including a plurality of cylinders. Each of the cylinders is provided with a piston 3, which is provided so as to be reciprocable. A lower part of an engine block 2 is provided with a crankcase 4. This crankcase 4 is constituted of the lower part of the engine block 2 in combination with an oil pan 5. In the crankcase 4, a crank shaft 6 is rotatably supported, to which the piston 3 is connected through a con-rod 7.

In each cylinder, a combustion chamber 8 is formed above each piston 3. In an upper part of the engine block 2, intake ports 9 and exhaust ports 10 are formed communicating with the corresponding combustion chambers 8. An intake valve 11 is provided in each intake port 9, while an exhaust valve 12 is provided in each exhaust port 10. Each of the intake valves 11 and each of the exhaust valves 12 are operated by a known valve-moving mechanism 13 to open and close in sync with rotation of the crank shaft 6. The opening and closing motions of those intake valves 11 and the exhaust valves 12 cause outside air to be drawn into the combustion chambers 8 through the intake ports 9 and exhaust gas after burning to be discharged from the combustion chambers 8 to the exhaust ports 10. On the upper part of the engine block 2, there is placed a head cover 14 covering over the valve-moving mechanism 13 and others.

Each intake port 9 is connected to an intake passage 15. At an inlet of this intake passage 15, an air cleaner 16 is provided. In the intake passage 15, an electrically-operated electronic throttle device 18 including a throttle valve 17 and a surge tank 19 are provided. A part of the intake passage 15 downstream of the electronic throttle device 18 is constituted of a known intake manifold 31 including the surge tank 19. The electronic throttle device 18 is configured to drive a motor (not shown) to open and close the throttle valve 17 in response to operations of an accelerator pedal (not shown) provided at a driver's seat. The electronic throttle valve 18 corresponds to one example of an intake amount regulating unit of the invention. The surge tank 19 functions to suppress pulsation of intake air flowing through the intake passage 15. Air purified by the air cleaner 16 is drawn into each combustion chamber 8 through the corresponding intake passage 15, the electronic throttle device 18, and each intake port 9. The amount of air to be drawn (the amount of intake air) is regulated according to an opening degree of the throttle valve 17. The engine block 2 is provided with injectors 20 for injecting and supplying a fuel into the combustion chambers 8. The fuel injected from each injector 20 into a corresponding one of the combustion chambers 8 is mixed with intake air, forming an air-fuel mixture. On the upper part of the engine block 2, ignition plugs 21 are provided to ignite the air-fuel mixture in the corresponding combustion chambers 8. Each ignition plug 21 is operated by high voltage applied from an ignitor 22.

Each exhaust port 10 is connected to an exhaust passage 23 including an exhaust manifold. Exhaust gas generated in the each combustion chamber 8 after burning is discharged out through the exhaust port 10, the exhaust passage 23, and others.

In the present embodiment, the gasoline engine system is provided with a BGV apparatus configured to allow blow-by gas generated in each combustion chamber 8 to flow in a part of the intake passage 15 (the intake manifold 31) downstream of the electronic throttle device 18 (the throttle valve 17) and return to the engine. This apparatus includes a blow-by gas storage unit configured to store the blow-by gas generated in the engine 1. The blow-by gas storage unit includes the crankcase 4 and the head cover 14. These crankcase 4 and head cover 14 are connected to each other through a communication passage 2a provided in the engine block 2. The crankcase 4 is provided with an oil separator 24. This oil separator 24 functions to separate oil, such as lubricant oil having mixed in the blow-by gas in the crankcase 4, from the blow-by gas and trap the separated oil. Between the oil separator 24 and the part of the intake passage 15 (the intake manifold 31) downstream of the throttle valve 17, a blow-by gas returning passage (hereinafter, referred to as a "BGV passage") 26 is provided to allow blow-by gas to flow from the crankcase 4 to the intake passage 15. This BGV passage 26 consists of a pipe or pipes, such as a hose or hoses. Further, the intake manifold 31 is provided with a PCV valve 27 for adjusting a flow rate of the blow-by gas. Herein, the PCV valve 27 is a known electrically-operated valve configured to open at a variable opening degree and is directly mounted (direct mounting) on the intake manifold 31 without interposing a pipe or the like. The PCV valve 27 corresponds to one example of a gas flow regulating unit of the invention. Between a part of the intake passage 15 upstream of the throttle valve 17 and the head cover 14, a fresh-air introduction passage 28 is provided to introduce fresh air (outside air) into the head cover 14 in order to purge the blow-by gas from the head cover 14 and the crankcase 4. The fresh air introduced in the head cover 14 is drawn into the crankcase 4 through the communication passage 2a.

The aforementioned engine system is further provided with an electronic control unit (ECU) 50. The air cleaner 16 is provided with an air flow meter 51 for detecting an amount of intake air (intake amount) Ga flowing through the intake passage 15. The air flow meter 51 corresponds to one example of an intake amount detecting unit of the invention. The electronic throttle device 18 is provided with a throttle sensor 52 for detecting an opening degree of the throttle valve 17 (throttle opening degree). The surge tank 19 is provided with an intake pressure sensor 53 to detect a pressure of intake air (intake pressure) PM in the intake passage 15. The engine block 2 is provided with a rotation speed sensor 54 to detect a rotation angle (crank angle) of the crank shaft 6 as an engine rotation speed NE. The engine block 2 is provided with a water temperature sensor 55 to detect a temperature of coolant (coolant temperature) THW flowing through the engine block 2. The exhaust passage 23 is provided with an oxygen sensor 56 to detect a concentration of oxygen in exhaust air. This oxygen sensor 56 corresponds to one example of an air-fuel ratio detecting unit of the invention. Those various sensors 51 to 56 correspond to one example of an operating state detecting unit to detect an operating state of the engine 1. The ECU 50 executes fuel injection controls including air-fuel ratio control, ignition timing control, blow-by gas returning control, and others, based on the intake amount Ga, the throttle opening degree TA, the intake pressure PM, the engine rotation speed NE, the coolant temperature THW, and the oxygen concentration Ox, which are detected by the various sensors 51 to 56 and others. In the fuel injection control, the ECU 50 controls each injector 20 according to the operating state of the engine 1 to supply a fuel to the engine 1. When receiving supply of the fuel, the engine 1 generates drive power. During deceleration, under a predetermined condition, the ECU 50 stops fuel injection from the injectors 20 to shut off the supply of the fuel to the engine 1 (Fuel Cut). In the ignition time control, the ECU 50 activates the ignitors 22 according to the operating state of the engine 1 to control the ignition plugs 21. In the blow-by gas returning control, the ECU 50 controls the PCV valve 27 according to the operating state of the engine 1. In the present embodiment, the ECU 50 corresponds to one example of an abnormality diagnosis unit of the invention.

The aforementioned engine system is further provided with an abnormality diagnosis device to diagnose abnormalities of the BGV apparatus. This abnormality diagnosis device includes an abnormality diagnosis unit configured to diagnose abnormalities of the BGV passage 26 and the PCV valve 27. In the present embodiment, the ECU 50 corresponds to one example of the abnormality diagnosis unit. The ECU 50 executes the abnormality diagnosis control for diagnosing abnormalities of the BGV passage 26 and the PCV valve 27.

Herein, an assumable abnormality mode of the BGV passage 26 and the PCV valve 27 may include situations where the pipe(s) (the hose(s) or the like) constituting the BGV passage 26 are disconnected, the pipe(s) is perforated, the pipe(s) is clogged, or the PCV valve 27 is stuck in a certain valve open or closed position.

Figure 2:
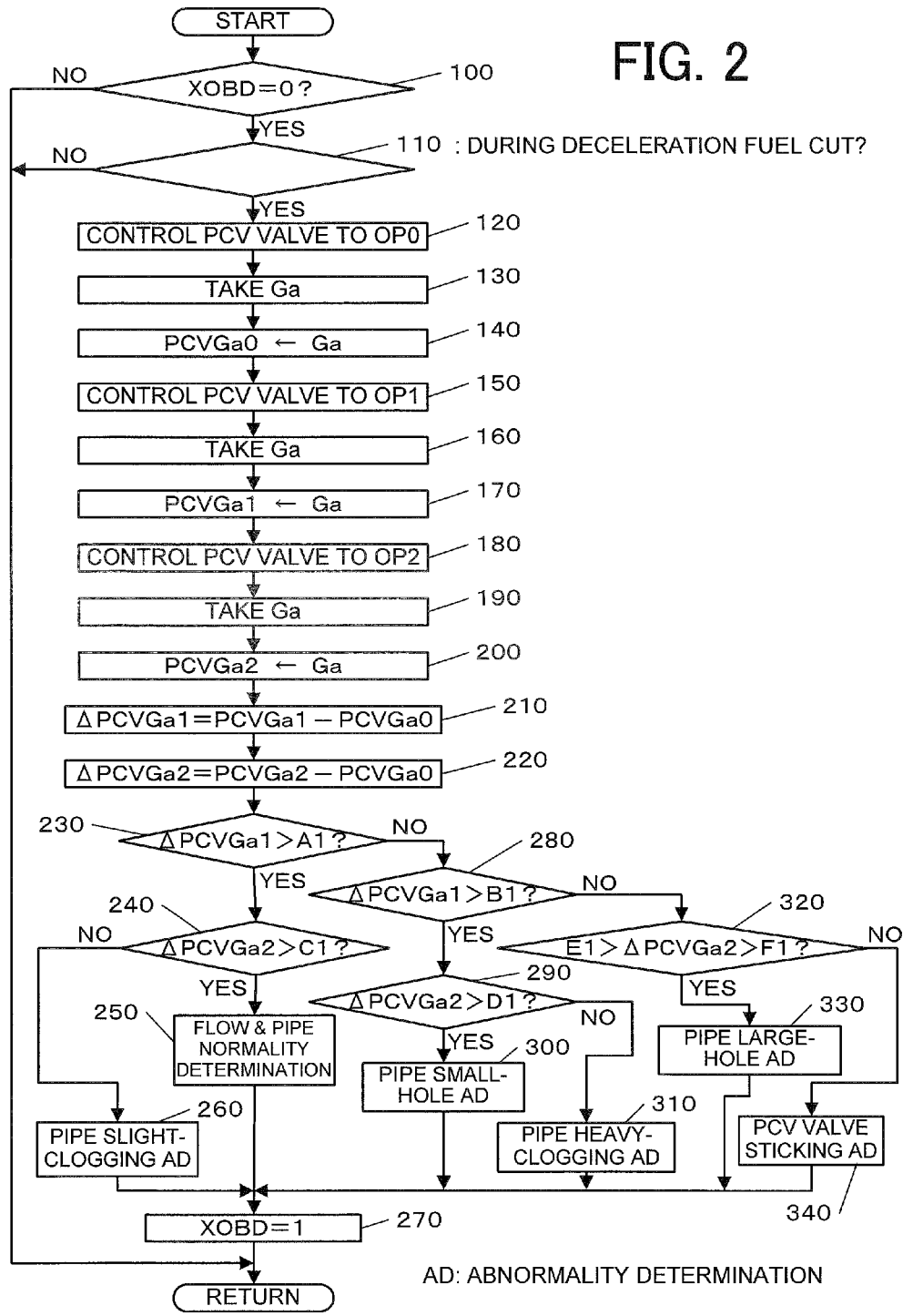
FIG. 2 is a flowchart showing contents of first abnormality diagnosis control in the first embodiment.
Figure 3:
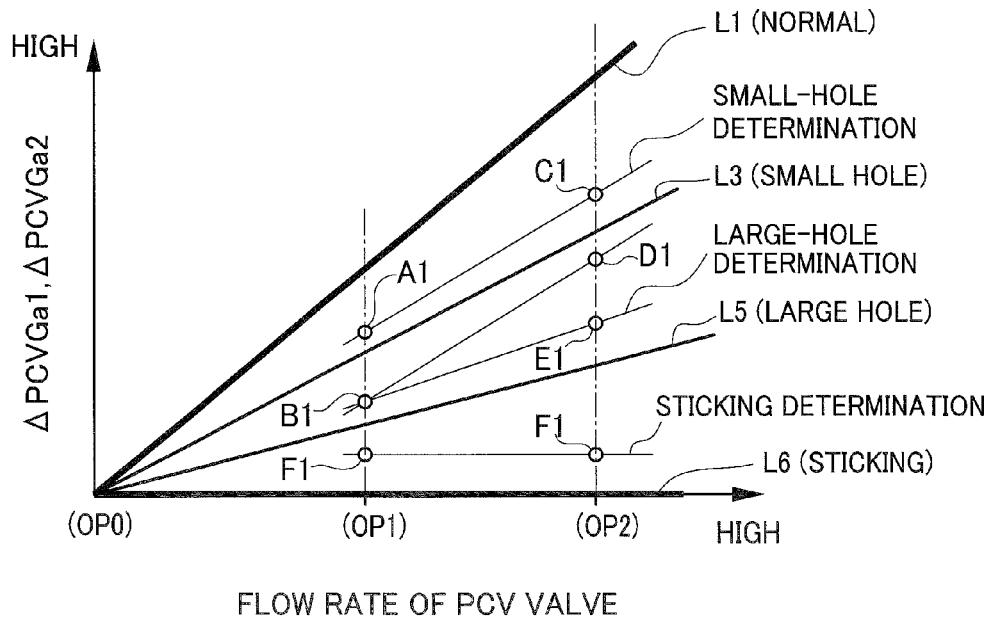
FIG. 3 is a graph showing first determination data for abnormality diagnosis in the first embodiment.
Figure 4:
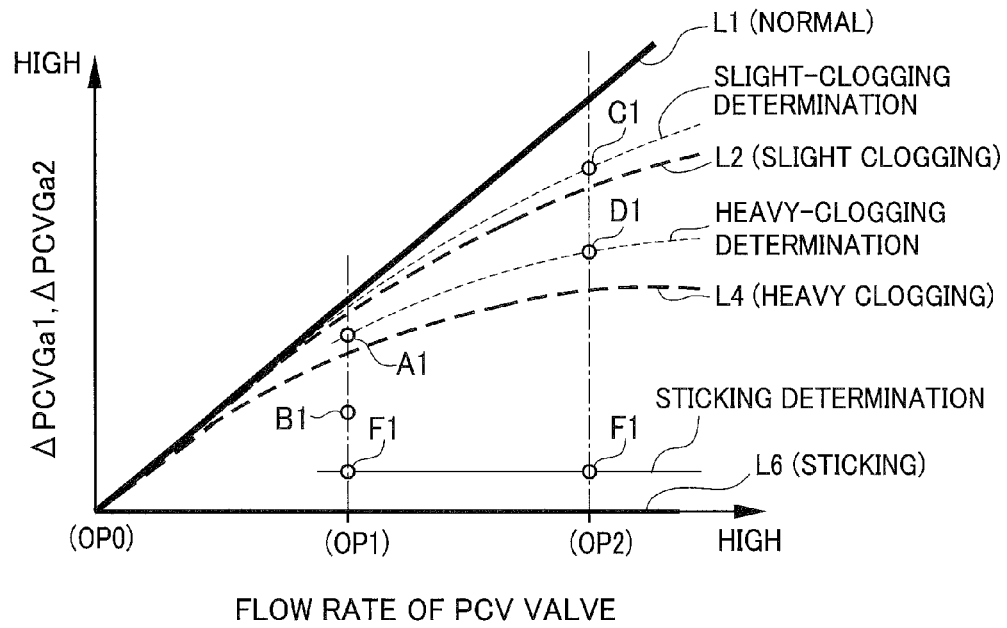
FIG. 4 is a graph showing second determination data for abnormality diagnosis in the first embodiment.
Figure 5:
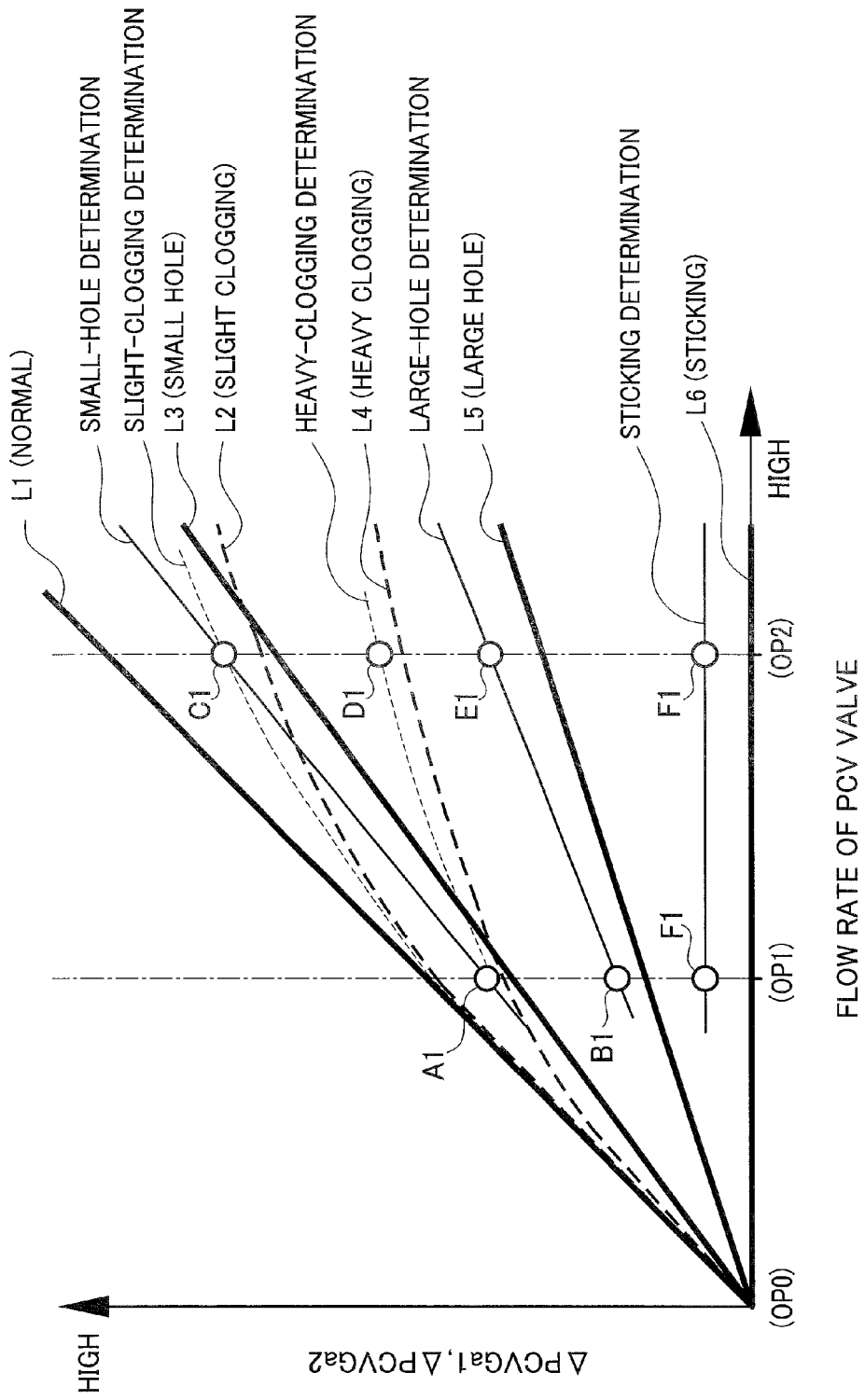
FIG. 5 is a graph showing the first determination data and the second determination data combined into one in the first embodiment.

First abnormality diagnosis control to be executed by the ECU 50 will be described below. FIG. 2 is a flowchart showing contents of this abnormality diagnosis control. FIG. 3 is a graph showing first determination data used for abnormality diagnosis. FIG. 4 is a graph showing second determination data used for abnormality diagnosis. FIG. 5 is a graph showing the first determination data and the second determination data combined into one.

When the processing enters a routine shown in FIG. 2, the ECU 50 determines in step 100 whether or not an abnormality diagnosis flag XOBD is 0, that is, whether or not abnormality diagnosis has been unexecuted. This flag XOBD is set to 1 when the abnormality diagnosis has been executed as described later. If an affirmative result is obtain in this step (i.e., if YES in step 100), the ECU 50 advances the processing to step 110. If a negative result is obtained in this step (i.e., if NO in step 100), the ECU 50 returns the processing to step 100.

In step 110, the ECU 50 determines whether or not deceleration fuel cut is being executed. In other words, it is judged whether the engine 1 is in a state where the engine 1 is decelerating and fuel supply to the engine 1 through the injectors 20 (fuel injection) is shut off. During deceleration of the engine 1, the ECU 50 controls the electronic throttle device 18 under a predetermined condition to close the throttle valve 17 and shut off fuel injection through the injectors 20. Accordingly, during this deceleration fuel cut, no torque occurs in the engine 1 and the throttle valve 17 is in a valve closed state, so that intake air passes, in constant sonic condition, through the throttle valve 17. If YES in step 110, the ECU 50 advances the processing to step 120. If NO in step 110, the ECU 50 returns the processing to step 100.

In step 120, the ECU 50 controls the PCV valve 27 to a zero opening degree OP0. That is, the ECU 50 controls the PCV valve 27 to fully close.

In step 130, subsequently, the ECU 50 takes a detection value of the air flow meter 51 as an intake amount Ga obtained when the PCV valve 27 is controlled to the zero opening degree OP0.

In step 140, the ECU 50 sets the intake amount Ga read in step 130 as an intake amount for the zero opening degree ("0-opening intake amount") PCVGa0. This 0-opening intake amount PCVGa0 corresponds to one example of a zeroth intake amount of the invention.

In step 150, the ECU 50 controls the PCV valve 27 to a first opening degree OP1. Herein, the first opening degree OP1 means a predetermined opening degree larger than the zero opening degree OP0 and smaller than a full open degree.

In step 160, the ECU 50 takes a detection value of the air flow meter 51 as an intake amount Ga obtained when the PCV valve 27 is controlled to the first opening degree OP1.

In step 170, the ECU 50 sets the intake amount Ga read in step 160 as an intake amount for the first opening degree ("1$^{st}$-opening intake amount") PCVGa1. This 1$^{st}$-opening intake amount PCVGa1 corresponds to one example of a first intake amount of the invention.

In step 180, the ECU 50 controls the PCV valve 27 to a second opening degree OP2. Herein, the second opening degree OP2 means a predetermined opening degree larger than the first opening degree OP1 and smaller than the full open degree.

In step 190, the ECU 50 takes a detection value of the air flow meter 51 as an intake amount Ga obtained when the PCV valve 27 is controlled to the second opening degree OP2.

In step 200, the ECU 50 sets the intake amount Ga read in step 190 as an intake amount for the second opening degree ("$2^{nd}$-opening intake amount") PCVGa2. This $2^{nd}$-opening intake amount PCVGa2 corresponds to one example of a second intake amount of the invention.

In step 210, the ECU 50 calculates a difference between the $1^{st}$-opening intake amount PCVGa1 and the 0-opening intake amount PCVGa0 as a $1^{st}$-opening intake increased amount ΔPCVGa1. Specifically, assuming that the 0-opening intake amount PCVGa0 as a reference intake amount, an increased amount of the $1^{st}$-opening intake amount PCVGa1 from the reference intake amount is calculated. This $1^{st}$-opening intake increased amount ΔPCVGa1 corresponds to one example of a first intake increased amount of the invention.

In step 220, the ECU 50 calculates a difference between the $2^{nd}$-opening intake amount PCVGa2 and the 0-opening intake amount PCVGa0 as a $2^{nd}$-opening intake increased amount ΔPCVGa2. Specifically, the 0-opening intake amount PCVGa0 is assumed as a reference intake amount, and an increase amount of the $2^{nd}$-opening intake amount PCVGa2 from the reference intake amount is calculated. This $2^{nd}$-opening intake amount PCVGa2 corresponds to one example of a second intake increased amount of the invention.

In step 230, the ECU 50 then determines whether or not the $1^{st}$-opening intake increased amount ΔPCVGa1 obtained when the PCV valve 27 is controlled to the first opening OP1 is larger than a predetermined value A1. The ECU 50 advances the processing to step 240 if YES in step 230 or alternatively shifts the processing to step 280 if NO in step 230. This predetermined value A1 corresponds to one example of a third predetermined value of the invention.

In step 240, subsequently, the ECU 50 checks whether or not the $2^{nd}$-opening intake increased amount ΔPCVGa2 obtained when the PCV valve 27 is controlled to the second opening OP2 is larger than a predetermined value C1 (C1>A1). The ECU 50 advances the processing to step 250 if YES in step 240 or shifts the processing to step 260 if NO in step 240. This predetermined value C1 corresponds to one example of a fourth predetermined value of the invention.

In step 250, the ECU 50 determines that the flow rate of the blow-by gas and the pipes are normal (Normality Determination). The ECU 50 can store this normality determination in a memory.

The above determination will be explained below referring to the first determination data shown in FIG. 3. In FIG. 3, a horizontal axis indicates a flow rate of the PCV valve 27, i.e., a flow rate of blow-by gas flowing through the PCV valve 27 (the same applies hereinafter), and a vertical axis indicates values of the $1^{st}$-opening intake increased amount ΔPCVGa1 and the $2^{nd}$-opening intake increased amount ΔPCVGa2. Points (OP0), (OP1), and (OP2) in the horizontal axis respectively indicate the flow rates of the PCV valve 27 at the zero opening degree, the first opening degree OP1, and the second opening degree OP2 (the same meaning applies hereinafter and FIGS. 4, 5, and 12). Specifically, the affirmative determination result in step 240 indicates that the $1^{st}$-opening intake increased amount ΔPCVGa1 for the flow rate of the PCV valve 27 controlled to the first opening degree OP1 is larger than the predetermined value A1 and also the $2^{nd}$-opening intake increased amount ΔPCVGa2 for the flow rate of the PCV valve 27 controlled to the second opening degree OP2 is larger than the predetermined value C1. It is thus considered that a change from the $1^{st}$-opening intake increased amount ΔPCVGa1 to the $2^{nd}$-opening intake increased amount ΔPCVGa2 appears as for example a linear change indicated by a straight line L1 (Normal) which is located above a straight line A1-C1 (Small-hole Determination) connecting points A1 and C1 and passes an origin as shown in FIG. 3. In this case, the BGV apparatus is determined to be normal.

In step 270, thereafter, the ECU 50 sets an abnormality diagnosis flag XOBD to 1 and returns the processing to step 100.

Alternatively, in step 260 following step 240, the ECU 50 determines that a pipe (the BGV passage 26) is slightly clogged, namely, that a pipe slight-clogging abnormality has occurred, and then advances the processing to step 270. The ECU 50 can store that abnormality determination in the memory or execute a predetermined informing operation.

The above determination will be explained below referring to second determination data shown in FIG. 4. Specifically, the negative determination result in step 240 indicates that the $1^{st}$-opening intake increased amount ΔPCVGa1 is larger than the predetermined value A1 and also the $2^{nd}$-opening intake increased amount ΔPCVGa2 is equal to or less than the predetermined value C1. It is thus considered that a change from the $1^{st}$-opening intake increased amount ΔPCVGa1 to the $2^{nd}$-opening intake increased amount ΔPCVGa2 appears as for example a curved change indicated by a curved broken line L2 (Slight Clogging) which is located below a curved broken line (Slight-clogging Determination) passing through the point C1 and passes the origin as shown in FIG. 4. In this case, the BGV passage 26 is determined to be abnormal due to slight clogging.

Alternatively, in the step 280 following step 230, the ECU 50 determines whether or not the $1^{st}$-opening intake increased amount ΔPCVGa1 is larger than a predetermined value B1 (C1>A1>B1). The ECU 50 advances the processing to step 290 if YES in step 280 or shifts the processing to step 320 if NO in step 280.

In step 290, the ECU 50 determines whether or not the $2^{nd}$-opening intake increased amount ΔPCVGa2 is larger than a predetermined value D1 (C1>D1>A1>B1). The ECU 50 advances the processing to step 300 if YES in step 290 or shifts the processing to step 310 if NO in step 290.

In step 300, the ECU 50 determines that the pipe (the BGV passage 26) is perforated with a small hole(s), namely, that a small-hole abnormality has occurred, and shifts the processing to step 270. The ECU 50 can store this abnormality determination in the memory or execute a predetermined informing operation.

Specifically, the affirmative determination result in step 290 indicates that the $1^{st}$-opening intake increased amount ΔPCVGa1 is equal to or less than the predetermined value A1 and larger than the predetermined value B1 and also the $2^{nd}$-opening intake increased amount ΔPCVGa2 is larger than the predetermined value D1 (<C1). It is thus considered that a change from the $1^{st}$-opening intake increased amount ΔPCVGa1 to the $2^{nd}$-opening intake increased amount ΔPCVGa2 appears as for example a linear change indicated by a straight line L3 (Small Hole) which is located above a straight line B1-D1 connecting points B1 and D1 and below the straight line A1-C1 (Small-hole Determination) and passes the origin as shown in FIG. 3. In this case, the BGV passage 26 is determined to be abnormal due to small hole.

In contrast, in step 310 following step 290, the ECU 50 decides that the pipe (the BGV passage 26) is heavily or severely clogged, namely, that a pipe heavy-clogging abnormality has occurred, and then shifts the processing to step 270. The ECU 50 can store that abnormality determination in the memory or execute a predetermined informing operation.

Specifically, the negative determination result in step 290 indicates that the $1^{st}$-opening intake increased amount $\Delta$PCVGa1 is equal to or less than the predetermined value A1 and larger than the predetermined value B1 and also the $2^{nd}$-opening intake increased amount $\Delta$PCVGa2 is equal to or less than the predetermined value D1 (<C1). It is thus considered that a change from the $1^{st}$-opening intake increased amount $\Delta$PCVGa1 to the $2^{nd}$-opening intake increased amount $\Delta$PCVGa2 appears as for example a curved change indicated by a curved broken line L4 (Heavy Clogging) which is located below a curved broken line A1-D1 (Heavy-clogging Determination) passing through the points A1 and D1 and passes through the origin as shown in FIG. 4. In this case, the BGV passage 26 is determined to be abnormal due to heavy clogging.

Alternatively, in step 320 following step 280, the ECU 50 determines whether or not the $2^{nd}$-opening intake increased amount $\Delta$PCVGa2 is smaller than a predetermined value E1 (C1>D1>A1>E1>B1) and larger than a predetermined value F1 (C1>D1>A1>E1>B1>F1). The ECU 50 advances the processing to step 330 if YES in step 320 or shifts the processing to step 340 if NO in step 320.

In step 330, the ECU 50 determines that the pipe (the BGV passage 26) is perforated with a large hole(s), namely, that a pipe large-hole abnormality has occurred, and shifts the processing to step 270. The ECU 50 can store this abnormality determination in the memory or execute a predetermined informing operation.

Specifically, the affirmative determination result in step 320 indicates that the $1^{st}$-opening intake increased amount $\Delta$PCVGa1 is equal to or less than the predetermined value A1 and equal to or less than the predetermined value B1 and also the $2^{nd}$-opening intake increased amount $\Delta$PCVGa2 is smaller than the predetermined value E1 and larger than the predetermined value F1. It is thus considered that a change from the $1^{st}$-opening intake increased amount $\Delta$PCVGa1 to the $2^{nd}$-opening intake increased amount $\Delta$PCVGa2 appears as for example a linear change indicated by a straight line L5 (Large Hole) which is located below a straight line B1-E1 (Large-hole Determination) connecting the points B1 and E1 and passes through the origin as shown in FIG. 3. In this case, the BGV passage 26 is determined to be abnormal due to large hole.

In contrast, in step 340 following step 320, the ECU 50 determines that the PCV valve 27 is stuck at a certain opening degree, namely, that a sticking abnormality has occurred, and the ECU 50 shifts the processing to step 270. The ECU 50 can store that abnormality determination in the memory or execute a predetermined informing operation.

Specifically, the negative determination result in step 320 indicates that the $1^{st}$-opening intake increased amount $\Delta$PCVGa1 is equal to or less than the predetermined value A1 and equal to or less than the predetermined value B1 and also the $2^{nd}$-opening intake increased amount $\Delta$PCVGa2 is larger than the predetermined value E1 or smaller than the predetermined value F1. It is thus considered that a change from the $1^{st}$-opening intake increased amount $\Delta$PCVGa1 to the $2^{nd}$-opening intake increased amount $\Delta$PCVGa2 appears as for example a linear change indicated by a straight line L6 (Sticking) which is located below a straight line F1-F1 (Sticking Determination) connected points F1 and F1 and passes through the origin as shown in FIG. 3. In this case, the PCV valve 27 is determined to be abnormal due to sticking.

According to the abnormality diagnosis device for the BGV apparatus in the present embodiment described above, the abnormality of the BGV apparatus is diagnosed during deceleration fuel cut of the engine 1. Herein, during the deceleration fuel cut, no torque is generated in the engine 1 and the throttle valve 17 of the electronic throttle device 18 is in a valve closed state, so that intake air passes, in constant sonic condition, through the throttle valve 17. Therefore, the difference between the $1^{st}$-opening intake amount PCVGa1 detected when the PCV valve 27 is controlled to the first opening degree OP1 and the $2^{nd}$-opening intake amount PCVGa2 detected when the PCV valve 27 is controlled to the second opening degree can be set relatively large. While the intake air is in sonic condition, even when the opening degree of the PCV valve 27 is changed, the intake amount passing through the electronic throttle device 18 does not change. Changing of the opening degree of the PCV valve 27 directly causes a change in the intake amount. This generates a relatively large difference between the $1^{st}$-opening intake amount PCVGa1 and the $2^{nd}$-opening intake amount PCVGa2. Thus, the flow rate can be changed as needed for determining a perforation abnormality to detect for example the generation of variously-sized holes in the pipe(s) forming the BGV passage 26. As a result, the variously-sized perforation abnormality in the pipe(s) forming the BGV passage 26 can be diagnosed with high accuracy. Moreover, it is unnecessary to take much time to perform this abnormality determination to enhance the accuracy of the abnormality determination. Thus, abnormality diagnosis can be carried out in a relatively short time.

In the present embodiment, the difference of the $1^{st}$-opening intake amount PCVGa1 and the difference of the $2^{nd}$-opening intake amount PCVGa2 from the 0-opening intake amount PCVGa0 are respectively calculated as the $1^{st}$-opening intake increased amount $\Delta$PCVGa1 and the $2^{nd}$-opening intake increased amount $\Delta$PCVGa2. Accordingly, the $1^{st}$-opening intake increased amount $\Delta$PCVGa1 and the $2^{nd}$-opening intake increased amount $\Delta$PCVGa2 are less influenced by an individual difference of the air flow meter 51. Furthermore, the $1^{st}$-opening intake increased amount $\Delta$PCVGa1 is compared with its dedicated predetermined values A1, B1, and F1, and also the $2^{nd}$-opening intake increased amount $\Delta$PCVGa2 is compared with its dedicated predetermined values C1, D1, E1, and F1. Variations in intake increased amount when the PCV valve 27 is changed from the first opening degree OP1 to the second opening degree OP2 is appropriately checked. This can enhance the accuracy of abnormality diagnosis of the BGV apparatus.

In the present embodiment, when the $1^{st}$-opening intake increased amount $\Delta$PCVGa1 is larger than the predetermined value A1, the $2^{nd}$-opening intake increased amount $\Delta$PCVGa2 is larger than the predetermined value C1, and a change from the $1^{st}$-opening intake increased amount $\Delta$PCVGa1 to the $2^{nd}$-opening intake increased amount $\Delta$PCVGa2 is a linear change, the BGV apparatus is determined to be normal. When the $1^{st}$-opening intake increased amount $\Delta$PCVGa1 is equal to or less than the predetermined value A1, the $2^{nd}$-opening intake increased amount $\Delta$PCVGa2 is equal to or less than the predetermined value C1, and a change from the $1^{st}$-opening intake increased amount $\Delta$PCVGa1 to the $2^{nd}$-opening intake increased amount $\Delta$PCVGa2 is a linear change, the BGV passage 26 is determined to be abnormal due to perforation. With the above conditions, the perforation abnormality of the BGV passage 26 can be readily determined. In this regard, the variously-sized perforation abnormality of the BGV passage 26 can be diagnosed with high accuracy and in a relatively short time.

In the present embodiment, furthermore, when the $2^{nd}$-opening intake increased amount ΔPCVGa2 is equal to or less than the predetermined value C1 and a change from the $1^{st}$-opening intake increased amount ΔPCVGa1 to the $2^{nd}$-opening intake increased amount ΔPCVGa2 is a curved change, the BGV passage 26 is determined to be abnormal due to clogging. With the above conditions, the clogging abnormality of the BGV passage 26 is readily determined. In this regard, the clogging abnormality of the BGV passage 26 can be also diagnosed with high accuracy and in a relatively short time.

According to the present embodiment, the PCV valve 27 is directly mounted on the intake manifold 31 constituting the intake passage 15. Thus, no pipe needs to be provided between the intake manifold 31 and the PCV valve 27, resulting in a reduction in the number of parts to be diagnosed for perforation abnormality.

Second Embodiment

A second embodiment embodying the abnormality diagnosis device for the BGV apparatus according to the present invention will be described in detail below referring to the accompanying drawings.

Please note that identical or similar parts in the following embodiments to those in the first embodiment are given the same reference signs as those in the first embodiment and the details thereof are omitted, and the following description will be given with a focus on differences from the first embodiment.

The second embodiment differs from the first embodiment in the contents of the abnormality diagnosis control. Herein, if the pipe(s) constituting the BGV passage 26 is perforated, the amount of air taken in the combustion chamber 8 increases more than the intake amount Ga detected by the air flow meter 51. This causes deviation of an air-fuel ratio A/F to a lean side during operation of the engine 1. In contrast, when the pipe(s) forming the BGV passage 26 is clogged, the air-fuel ratio A/F does not deviate to the lean side during operation of the engine 1. Accordingly, the abnormality diagnosis is executed by determination on whether the air-fuel ratio A/F deviates in combination with the abnormality diagnosis control in the first embodiment, so that a perforated state and a clogged state of the BGV passage 26 can be more correctly diagnosed. In the present embodiment, taking into consideration that the diagnosis is likely to be influenced by a deviation of the air-fuel ratio A/F during idling of the engine 1, the deviation of the air-fuel ratio A/F is diagnosed during the idling.

Figure 6:
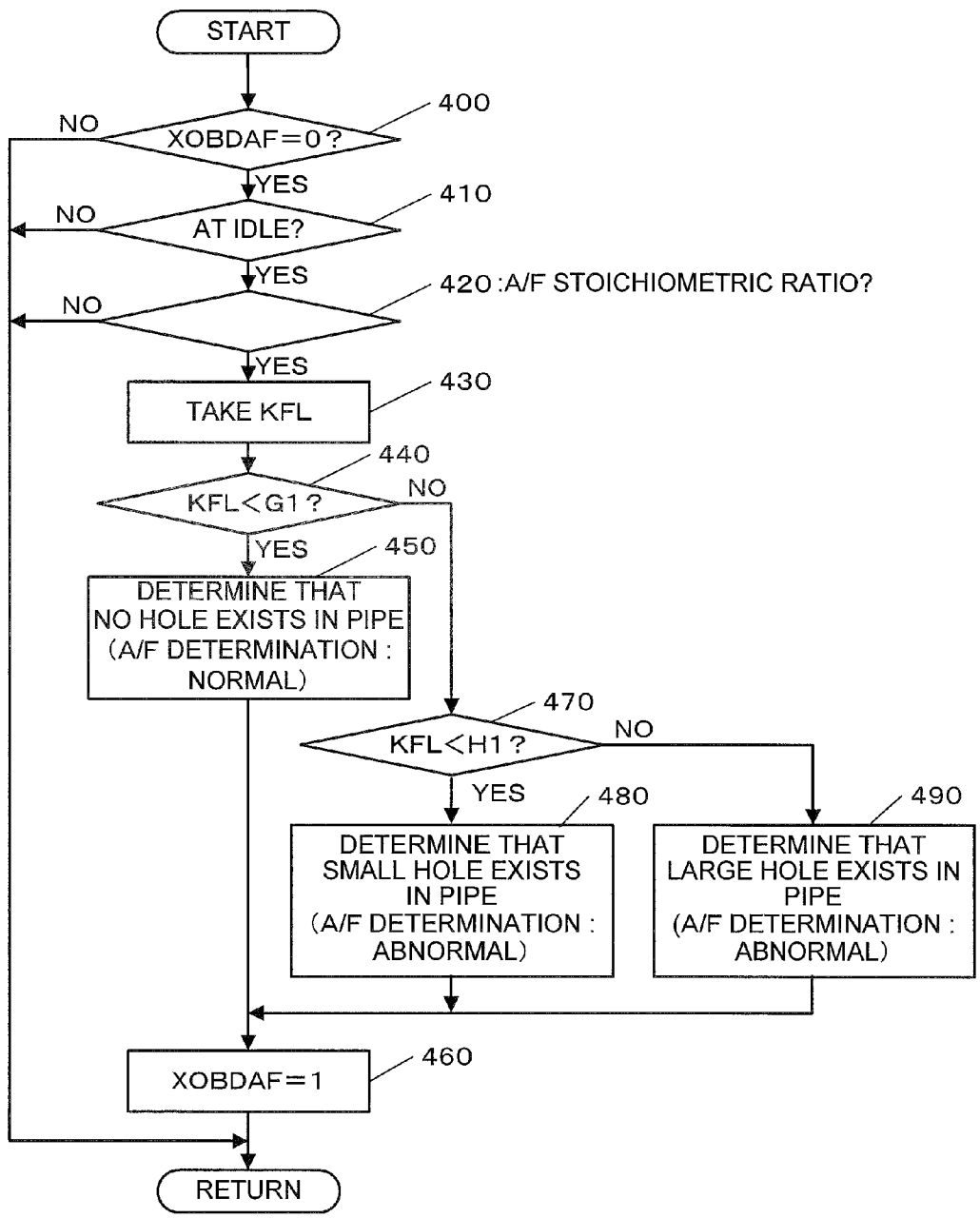
FIG. 6 is a flowchart showing contents of perforation abnormality diagnosis control based on a deviation of air-fuel ratio in a second embodiment.

FIG. 6 is a flowchart showing the contents of the perforation abnormality diagnosis control based on the deviation of the air-fuel ratio A/F. When the processing enters the routine, the ECU 50 determines in step 400 whether or not a perforation abnormality diagnosis flag XOBDAF is 0. This flag XOBDAF is set to 1 when the perforation abnormality diagnosis has been executed or to 0 when the perforation abnormality diagnosis has been unexecuted, as described later. Accordingly, the ECU 50 advances the processing to step 410 if YES in step 400, indicating that the perforation abnormality diagnosis has not been executed. Alternatively, the ECU 50 returns the processing to step 400 if NO in step 400, indicating that the perforation abnormality diagnosis has been executed.

In step 410, the ECU 50 determines whether or not the engine 1 is at idling. The ECU 50 can this determination for example based on a detection value of the throttle sensor 52 and a detection value of the rotation speed sensor 54. The ECU 50 advances the processing to step 420 if YES in step 410 or returns the processing to step 400 if NO in step 410.

In step 420, the ECU 50 determines whether or not the air-fuel ratio A/F is a stoichiometric ratio. The ECU 50 can perform this determination based on a detection value of the oxygen sensor 56. The ECU 50 advances the processing to step 430 if YES in step 420 or returns the processing to step 400 if NO in step 420.

Figure 7:
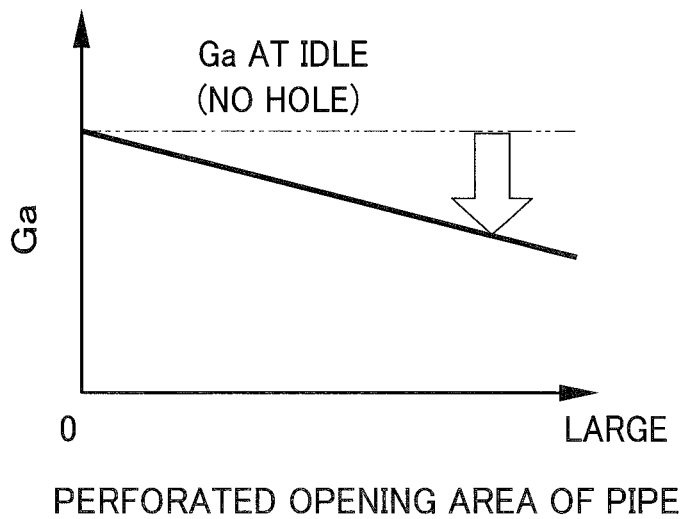
FIG. 7 is a graph showing a relationship of an intake amount to a perforated opening area of a pipe in the second embodiment.
Figure 8:
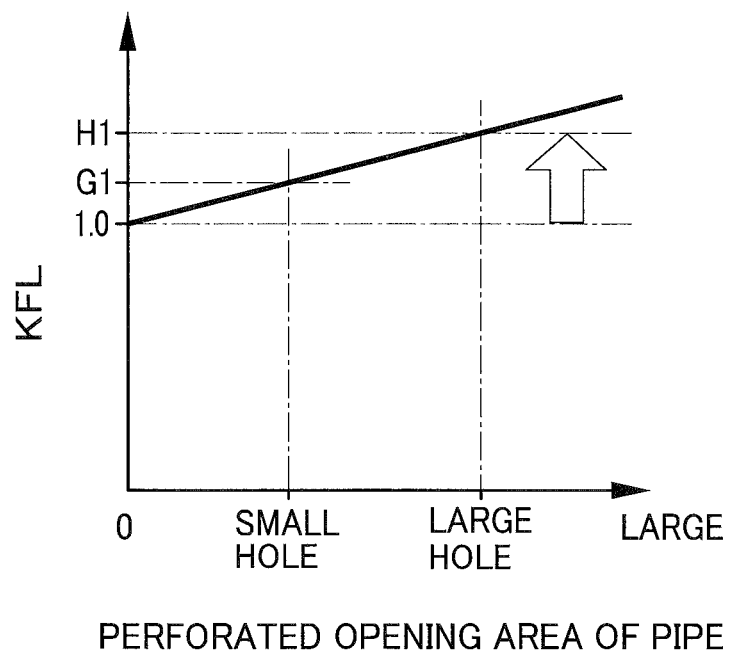
FIG. 8 is a graph showing a relationship of an air-fuel-ratio correcting fuel amount increasing ratio to the perforated opening area of the pipe in the second embodiment.

In step 430, the ECU 50 takes an air-fuel-ratio correcting fuel amount increasing ratio KFL. This increasing ratio KFL means a ratio of a fuel amount for correcting an air-fuel ratio ("air-fuel-ratio correcting fuel amount") with respect to a reference value when the air-fuel-ratio correcting fuel amount is increased. Herein, FIG. 7 is a graph showing a relationship of the intake amount Ga detected by the air flow meter 51 to a perforated opening area of the pipe forming the BGV passage 26. As clearly found from this graph, as the perforated opening area of the pipe becomes larger, the detected intake amount Ga gradually decreases as compared with a reference value defined by an intake amount Ga (detected when no hole is generated) during idling. In the fuel injection control, consequently, the fuel injection amount from the injector 20 decreases, so that the air-fuel ratio A/F deviates from the reference value to the lean side. In the air-fuel ratio control, therefore, the ECU 50 increases the air-fuel-ratio correcting fuel amount, resulting in an increase in the air-fuel-ratio correcting fuel amount increasing ratio KFL. The ECU 50 is configured to calculate this air-fuel-ratio correcting fuel amount increasing ratio KFL based on a detection value of the oxygen sensor 56 in the present embodiment. In this respect, the ECU 50 and the oxygen sensor 56 correspond to one example of an air-fuel ratio calculating unit of the invention. FIG. 8 is a graph showing a relationship of the air-fuel-ratio correcting fuel amount increasing ratio KFL to the perforated opening area of the pipe forming the BGV passage 26. As seen from this graph, as the perforated opening area of the pipe becomes larger (i.e., as a smaller intake amount Ga is detected), the air-fuel-ratio correcting fuel amount increasing ratio KFL gradually increases from the reference value, 1.0. In this step 430, the ECU 50 thus takes the air-fuel-ratio correcting fuel amount increasing ratio KFL that increases or decreases with the above relationship.

In step 440, the ECU 50 then checks whether or not the read air-fuel-ratio correcting fuel amount increasing ratio KFL is smaller than a predetermined value G1. As shown in FIG. 8, this predetermined value G1 is a reference value for determining that the perforated opening area of the pipe corresponds to a small hole. If the air-fuel-ratio correcting fuel amount increasing ratio KFL is smaller than the predetermined value G1, it indicates that the pipe is not perforated with any hole, i.e., no hole exists in the pipe. Accordingly, the ECU 50 advances the processing to step 450 if YES in step 440 or shifts the processing to step 470 if NO in step 440.

In step 450, the ECU 50 judges that no hole exists in the pipe. At that time, the air-fuel ratio A/F is determined to be normal. The ECU 50 can store this no-hole determination in the memory.

In step 460, the ECU 50 sets a perforation abnormality diagnosis flag XOBDAF to 1 and returns the processing to step 400.

In contrast, the ECU 50 determines in step 470 whether or not the read air-fuel-ratio correcting fuel amount increasing ratio KFL is smaller than a predetermined value H1. This predetermined value H1 is a reference value for determining that the perforated opening area of the pipe corresponds to a large hole as shown in FIG. 8. If the air-fuel-ratio correcting fuel amount increasing ratio KFL is smaller than the predetermined value H1, this indicates that the pipe is not perforated with any large hole, i.e., no large hole exists in the pipe. Consequently, the ECU 50 advances the processing to step 480 if YES in step 470 or shifts the processing to step 490 if NO in step 470.

In step 480, the ECU 50 decides that the pipe is perforated with a small hole, that is, a small hole exists in the pipe. At that time, the air-fuel ratio A/F is determined to be abnormal. The ECU 50 can store this determination of existence of a small hole in the memory. Then the ECU 50 shifts the processing to step 460.

In contrast, the ECU 50 determines in step 490 that the pipe is perforated with a large hole, that is, a large hole exists in the pipe. At that time, the air-fuel ratio A/F is determined to be abnormal. The ECU 50 can store this determination of existence of a large hole in the memory. Then, the ECU 50 shifts the processing to step 460.

Figure 9:
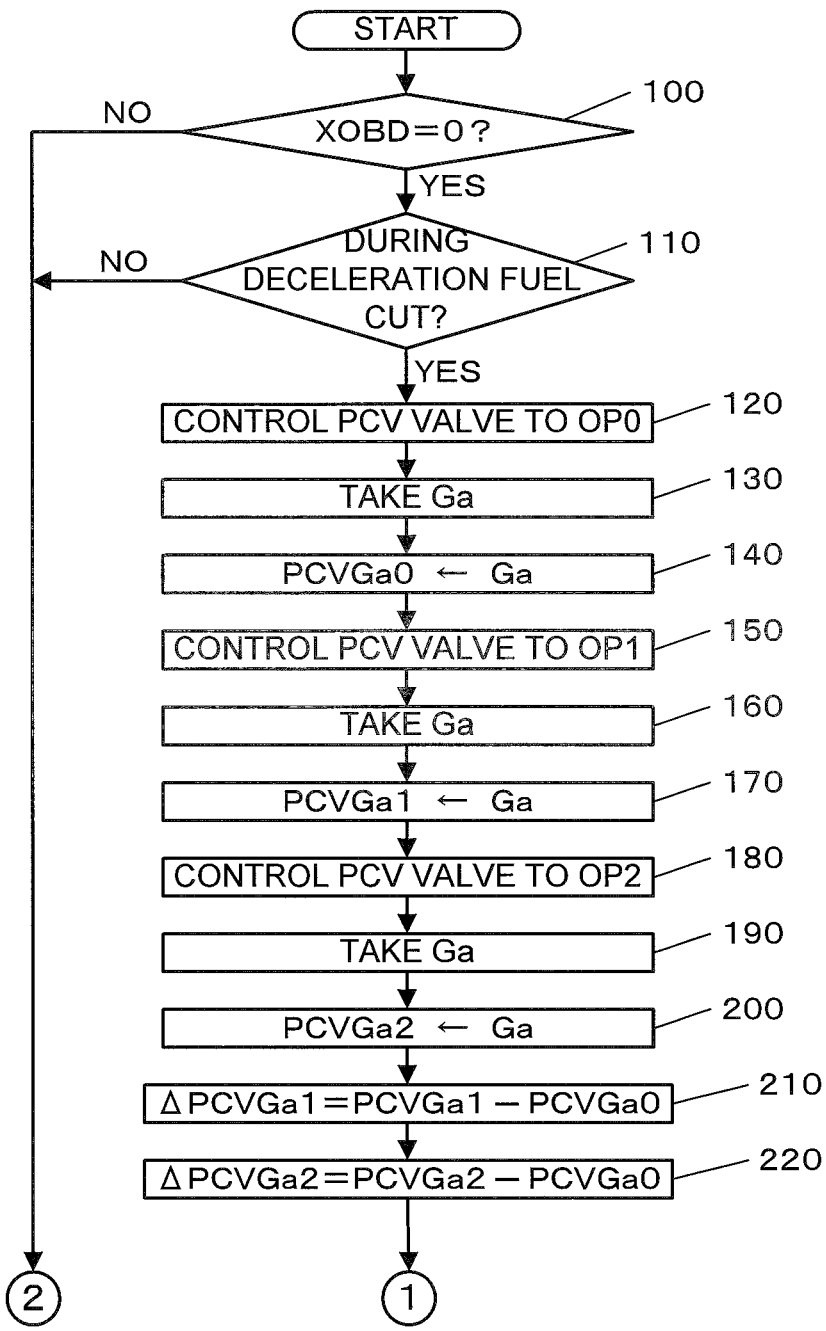
FIG. 9 is a flowchart showing part of contents of second abnormality diagnosis control in the second embodiment.
Figure 10:
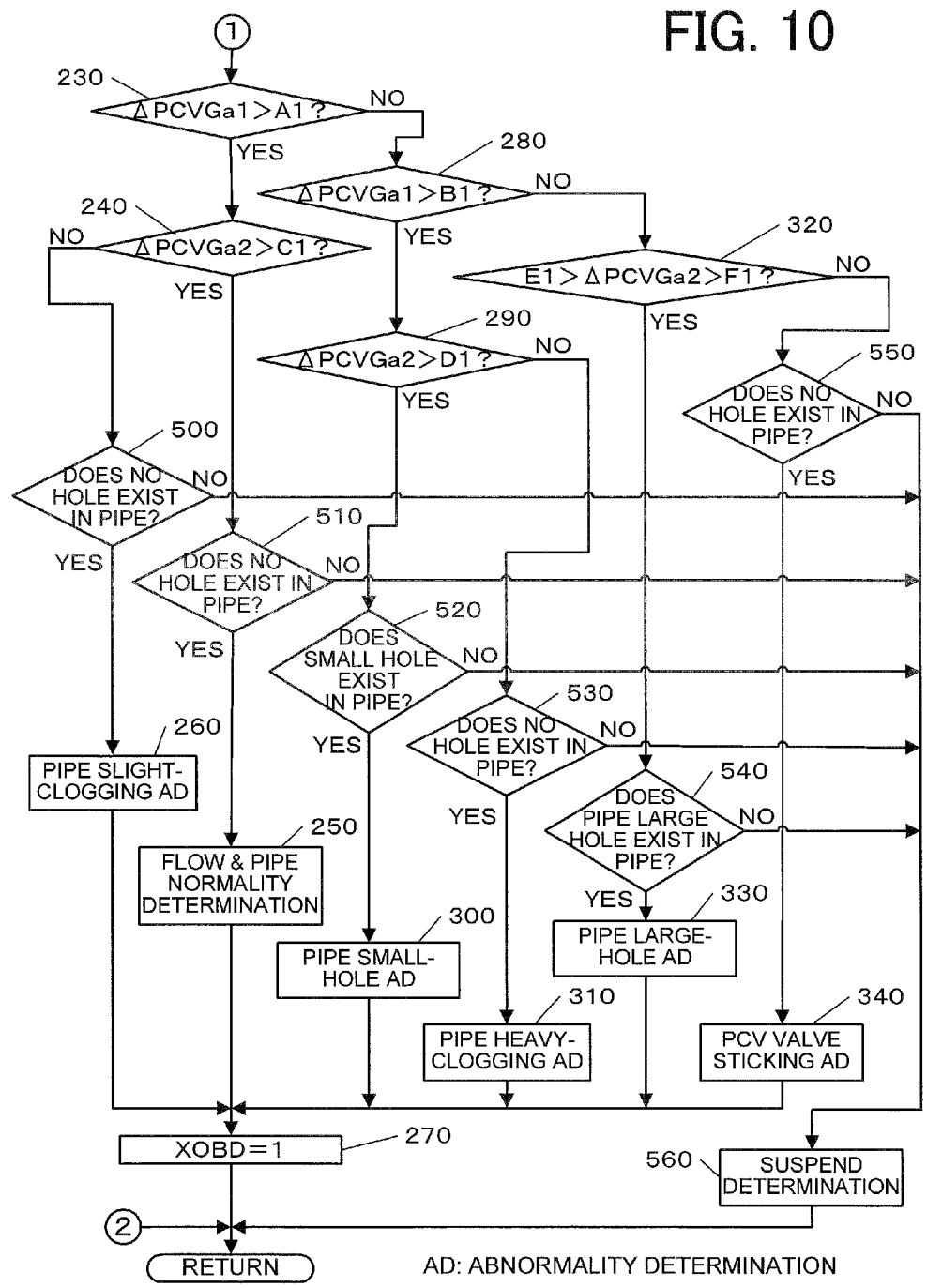
FIG. 10 is a flowchart showing another part of the contents of second abnormality diagnosis control in the second embodiment.

Next, second abnormality diagnosis control to be executed by the ECU 50 will be described below. FIGS. 9 and 10 are flowcharts showing the contents of the second abnormality diagnosis control. The flowcharts in FIGS. 9 and 10 differ from the flowchart in FIG. 2 in additional processings in step 500 to step 560 which are added to the processings in step 100 to step 340 in the flowchart in FIG. 2.

When the processing enters the routines in FIGS. 9 and 10, the ECU 50 executes the processings in step 100 to step 240, step 280, step 290, and step 320. In step 500 following step 240, the ECU 50 determines whether or not the pipe is not perforated with any hole forming the BGV passage 26, i.e., no hole exists in the pipe. The ECU 50 performs this determination by referring to the determination result obtained in the routine in FIG. 6. The ECU 50 advances the processing to step 260 if YES (no hole exists in the pipe) in step 500 or shifts the processing to step 560 if NO (a hole exists in the pipe) in step 500.

In step 260, the ECU 50 judges that the pipe slight-clogging abnormality has occurred. In addition, since it is confirmed in step 500 that no hole exists in the pipe, the determination in step 260 that the slight-clogging abnormality has occurred is obtained with enhanced reliability.

In contrast, in step 560 following step 500, the ECU 50 suspends the determination and returns the processing to step 100.

In step 510 following step 240, the ECU 50 further determines whether or not any hole exists in the pipe, as in step 500. The ECU 50 shifts the processing to step 250 if YES (no hole exists in the pipe) in step 510 or advances the processing to step 560 if NO (a hole(s) exists in the pipe) in step 510.

In step 250, the ECU 50 judges that the flow rate of blow-by gas and the pipe are normal. In addition, since it is confirmed in step 510 that no hole exists in the pipe, the reliability of the determination on the normality in step 250 is enhanced.

In step 520 following step 290, the ECU 50 determines whether or not a small hole exists in the pipe forming the BGV passage 26. The ECU 50 performs this determination by referring to the determination result obtained in the routine in FIG. 6. The ECU 50 advances the processing to step 300 if YES in step 520 or shifts the processing to step 560 if NO in step 520.

In step 300, the ECU 50 judges that the pipe small-hole abnormality has occurred. In addition, since it is confirmed in step 520 that the pipe has a small hole, the determination in step 300 that the pipe small-hole abnormality has occurred is obtained with enhanced reliability.

In step 530 following step 290, the ECU 50 further determines whether or not any hole exists in the pipe, as in step 500. The ECU 50 shifts the processing to step 310 if YES (no hole exists in the pipe) in step 530 or advances the processing to step 560 if NO (a hole(s) exists in the pipe) in step 530.

In step 310, the ECU 50 judges that the pipe heavy-clogging abnormality has occurred. In addition, since it is confirmed in step 530 that no hole exists in the pipe, the determination in step 310 that the pipe heavy-clogging abnormality has occurred is obtained with enhanced reliability.

In contrast, in step 540 following step 320, the ECU 50 determines whether or not a large hole exists in the pipe. The ECU 50 performs this determination by referring to the determination result obtained in the routine in FIG. 6. The ECU 50 advances the processing to step 330 if YES in step 540 or shifts the processing to step 560 if NO in step 540.

In step 330, the ECU 50 judges that the pipe large-hole abnormality has occurred. In addition, since it is confirmed in step 540 that the pipe has a large hole, the determination in step 330 that the pipe large-hole abnormality has occurred is obtained with enhanced reliability.

In step 550 following step 320, the ECU 50 determines whether or not the pipe is not perforated with any hole, as in step 500. The ECU 50 advances the processing to step 340 if YES (no hole exists in the pipe) in step 550 or shifts the processing to step 560 if NO (a hole(s) exists in the pipe) in step 550.

In step 340, the ECU 50 judges that the sticking abnormality has occurred, that is, that the PCV valve 27 is stuck at a certain opening degree. In addition, since it is confirmed in step 550 that no hole exists in the pipe, the determination result in step 340 that the sticking abnormality has occurred is obtained with enhanced reliability.

According to the abnormality diagnosis device for the BGV apparatus in the present embodiment described above, the following operations and advantages can be achieved in addition to the operations and advantages in the first embodiment. In the second embodiment, specifically, the ECU 50 is configured to determine whether or not the perforation abnormality has occurred in the BGV passage 26 based on a deviation of the calculated air-fuel ratio A/F from the predetermined reference value in combination with the abnormality diagnosis performed based on the detected intake amount Ga. Consequently, the diagnosis on the perforation abnormality is performed more reliably. Thus, the reliability of the perforation abnormality diagnosis in the BGV can be enhanced.

Third Embodiment

A third embodiment embodying the abnormality diagnosis device for the BGV apparatus according to the present invention will be described below with reference to the accompanying drawings.

The third embodiment differs from each of the aforementioned embodiments in the contents of the abnormality diagnosis control. In each embodiment described above, specifically, in FIGS. 2 and 9, steps 210 and 220 are configured to calculate the $1^{st}$-opening intake increased amount ΔPCVGa1 and the $2^{nd}$-opening intake increased amount ΔPCVGa2 and subsequent steps 230 to 340 are configured to diagnose the abnormality of the BGV apparatus based on those $1^{st}$-opening intake increased amount ΔPCVGa1 and the $2^{nd}$-opening intake increased amount ΔPCVGa2. In the third embodiment, as an alternative, the processings in the steps 210 and 220 are omitted and the abnormality of the BGV apparatus is diagnosed simply based on the $1^{st}$-opening intake amount PCVGa1 and the $2^{nd}$-opening intake amount PCVGa2 corresponding to the intake amount Ga.

Figure 11:
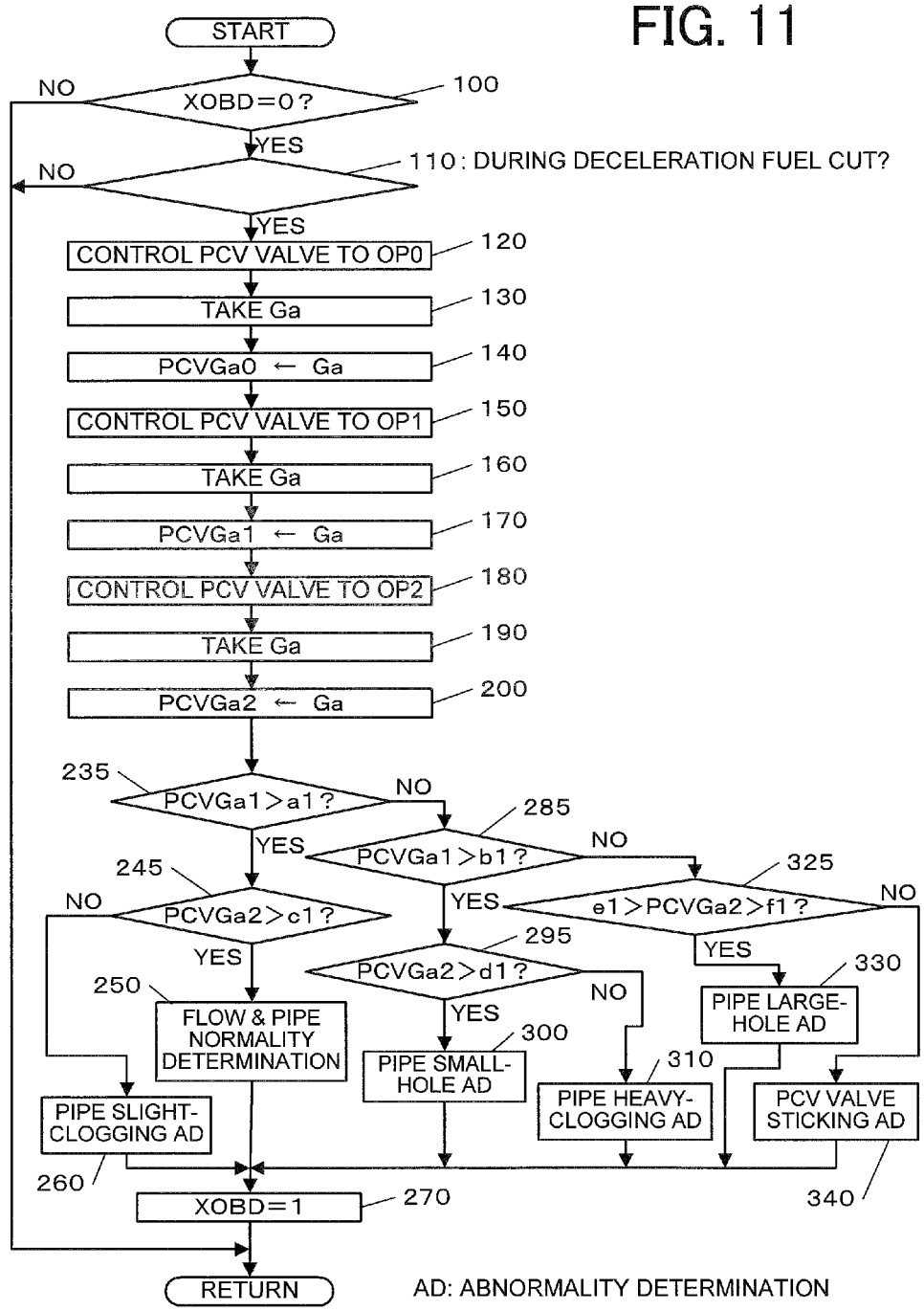
FIG. 11 is a flowchart showing contents of third abnormality diagnosis control in a third embodiment.
Figure 12:
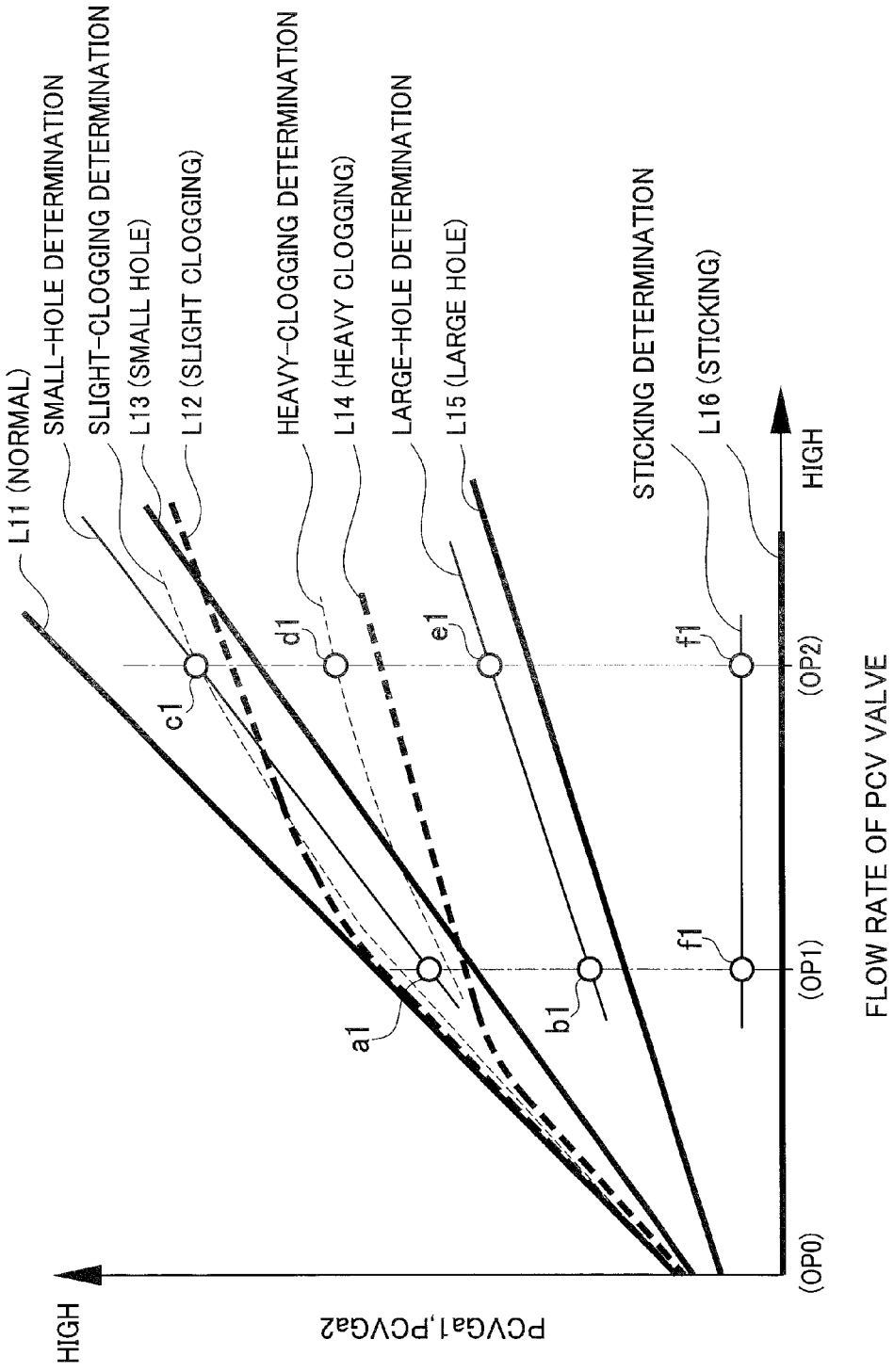
FIG. 12 is a graph showing third determination data for abnormality diagnosis in the third embodiment.

FIG. 11 is a flowchart showing the contents of third abnormality diagnosis control. FIG. 12 is a graph showing third determination data to be used for the abnormality diagnosis. The flowchart in FIG. 11 differs from the flowchart in FIG. 2 in that the steps 210 and 220 in the flowchart in FIG. 2 are removed, and the steps 230, 240, 280, 290, and 320 are replaced by steps 235, 245, 285, 295, and 325.

When the processing enters the routine shown in FIG. 11, the ECU 50 executes the processings in steps 100 to 200 and then advances to step 235. In step 235, the ECU 50 determines whether or not the $1^{st}$-opening intake amount PCVGa1 is larger than a predetermined value a1. This predetermined value a1 corresponds to one example of a first predetermined value of the invention. The ECU 50 advances the processing to step 245 if YES in step 235 or shifts the processing to step 285 if NO in step 235.

In step 245, the ECU 50 determines whether or not the $2^{nd}$-opening intake amount PCVGa2 is larger than a predetermined value c1 (c1>a1). This predetermined value c1 corresponds to one example of a second predetermined value of the invention. The ECU 50 advances the processing to step 250 if YES in step 245 or shifts the processing to step 260 if NO in step 245.

In step 250, the ECU 50 determines that the flow rate of the blow-by gas and the pipe are normal (Normality Determination). The ECU 50 can store this normality determination in the memory.

The above determination will be explained below referring to the third determination data shown in FIG. 12. In FIG. 12, a horizontal axis indicates a flow rate of the PCV valve 27 and a vertical axis represents the $1^{st}$-opening intake amount PCVGa1 and the $2^{nd}$-opening intake amount PCVGa2. Specifically, the affirmative determination result in step 245 indicates that the $1^{st}$-opening intake amount PCVGa1 for the flow rate of the PCV valve 27 controlled to the first opening degree OP1 is larger than the predetermined value a1 and the $2^{nd}$-opening intake amount PCVGa2 for the flow rate of the PCV valve 27 controlled to the second opening degree OP2 is larger than the predetermined value c1. It is thus considered that a change from the $1^{st}$-opening intake amount PCVGa1 to the $2^{nd}$-opening opening intake amount PCVGa2 appears as for example a linear change indicated by a straight line L11 (Normal) which is located above a straight line a1-c1 (Small-hole Determination) connecting points a1 and c1 and does not pass through the origin in FIG. 12. In this case, the BGV apparatus is determined to be normal.

In step 270, thereafter, the ECU 50 sets the abnormality diagnosis flag XOBD to 1 and returns the processing to step 100.

Alternatively, in step 260 following step 245, the ECU 50 determines that a pipe slight-clogging abnormality has occurred and advances the processing to step 270. The ECU 50 can store that abnormality determination in the memory and executes a predetermined informing operation.

Specifically, the negative determination result in step 245 indicates that the $1^{st}$-opening intake amount PCVGa1 is larger than the predetermined value a1 and the $2^{nd}$-opening intake amount PCVGa2 is equal to or less than the predetermined value c1. It is thus considered that a change from the $1^{st}$-opening intake amount PCVGa1 to the $2^{nd}$-opening intake amount PCVGa2 appears as for example a curved change shown by a curved broken line L12 (Slight Clogging) which is located below a curved broken line (Slight-clogging Determination) passing through the point c1 and does not pass through the origin in FIG. 12. In this case, the BGV passage 26 is determined to be abnormal due to slight clogging.

Alternatively, in step 285 following step 235, the ECU 50 checks whether or not the $1^{st}$-opening intake amount PCVGa1 is larger than a predetermined value b1 (c1>a1>b1). The ECU 50 advances the processing to step 295 if YES in step 285 or shifts the processing to 325 if NO in step 285.

In step 295, the ECU 50 determines whether or not the $2^{nd}$-opening intake amount PCVGa2 is larger than a predetermined value d1 (c1>d1>a1>b1). The ECU 50 advances the processing to step 300 if YES in step 295 or shifts the processing to step 310 if NO in step 295.

In step 300, the ECU 50 determines that a pipe small-hole abnormality has occurred, and then shifts the processing to step 270. The ECU 50 can store that abnormality determination in the memory and execute a predetermined informing operation.

Specifically, the affirmative determination result in step 295 indicates that the $1^{st}$-opening intake amount PCVGa1 is equal to or less than the predetermined value a1 and larger than the predetermined value b1 and the $2^{nd}$-opening intake amount PCVGa2 is larger than the predetermined value d1 (<c1). It is thus considered that a change from the $1^{st}$-opening intake amount PCVGa1 to the $2^{nd}$-opening intake amount PCVGa2 appears as for example a linear change indicated by a straight line L13 (Small Hole) which is located above the points b1 and d1 and below the straight line a1-c1 (Small-hole Determination) connecting the points a1 and c1 and does not pass through the origin in FIG. 12. In this case, the BGV passage 26 is determined to be abnormal due to small hole.

Alternatively, in step 310 following step 295, the ECU 50 decides that the pipe heavy-clogging abnormality has occurred and shifts the processing to step 270. The ECU 50 can store that abnormality determination in the memory and executes a predetermined informing operation.

Specifically, the negative determination result in step 295 indicates that the $1^{st}$-opening intake amount PCVGa1 is equal to or less than the predetermined value a1 and larger than the predetermined value b1 and the $2^{nd}$-opening intake amount PCVGa2 is equal to or less than the predetermined value d1. It is thus considered that a change from the $1^{st}$-opening intake amount PCVGa1 to the $2^{nd}$-opening intake amount PCVGa2 appears as for example a curved change shown by a curbed broken line L14 (Heavy Clogging) which is located below a curved broken line (Heavy-clogging Determination) passing through the point d1 and does not pass through the origin in FIG. 12. In this case, the BGV passage 26 is determined to be abnormal due to heavy clogging.

Alternatively, in step 325 following step 285, the ECU 50 determines whether or not the $2^{nd}$-opening intake amount PCVGa2 is smaller than a predetermined value e1 (e1>d1>a1>e1>b1) and larger than a predetermined value f1 (c1>d1>a1>e1>b1>f1). The ECU 50 advances the processing to step 330 if YES in step 325 or shifts the processing to step 340 if NO in step 325.

In step 330, the ECU 50 determines that a pipe large-hole abnormality has occurred and shifts the processing to step 270. The ECU 50 can store this abnormality determination in the memory and executes a predetermined informing operation.

Specifically, the affirmative determination result in step 325 indicates that the $1^{st}$-opening intake amount PCVGa1 is equal to or less than the predetermined value a1 and equal to or less than the predetermined value b1 and the $2^{nd}$-opening intake amount PCVGa2 is smaller than the predetermined value e1 and larger than the predetermined value f1. It is thus considered that a change from the $1^{st}$-opening intake amount PCVGa1 to the $2^{nd}$-opening intake amount PCVGa2 appears as for example a linear change shown by a straight line L15 (Large Hole) which is located below a straight line (Large-hole Determination) connecting the points b1 and e1 and does not pass through the origin in FIG. 12. In this case, the BGV passage 26 is determined to be abnormal due to large hole.

Alternatively, in step 340 following step 325, the ECU 50 determines that the PCV valve 27 is stuck at a certain opening degree, namely, that a sticking abnormality has occurred, and shifts the processing to step 270. The ECU 50 can store this abnormality determination in the memory and executes a predetermined informing operation.

Specifically, the negative determination result in step 325 indicates that the $1^{st}$-opening intake amount PCVGa1 is equal to or less than the predetermined value a1 and equal to or less than the predetermined value b1 and the $2^{nd}$-opening intake amount PCVGa2 is larger than the predetermined value e1 or smaller than the predetermined value f1. It is thus considered that a change from the $1^{st}$-opening intake amount PCVGa1 to the $2^{nd}$-opening opening intake amount PCVGa2 appears as for example a linear change shown by a straight line L16 (Sticking) which is located below a straight line f1-f1 (Sticking Determination) connecting points f1 and f1 and passes through the origin in FIG. 12. In this case, the PCV valve 27 is determined to be abnormal due to sticking.

According to the abnormality diagnosis device for the BGV apparatus in the present embodiment described above, instead of diagnosing the abnormality based on the $1^{st}$-opening intake increased amount ΔPCVGa1 and the $2^{nd}$-opening intake increased amount ΔPCVGa2 as in the first abnormality diagnosis control in the first embodiment, the abnormality is diagnosed directly based on the intake amount Ga ($1^{st}$-opening intake amount PCVGa1 and $2^{nd}$-opening intake amount PCVGa2) corresponding to the detection value (an absolute value) of the air flow meter 51. This may cause variation in the detected intake amount Ga due to individual difference (variation) of the air flow meter 51 and individual difference (variation) of the engine system and may slightly lower the diagnosis accuracy. However, the present embodiment can provide the operations and advantages almost equivalent to those in the first abnormality diagnosis control in the first embodiment.

In the present embodiment, the $1^{st}$-opening intake amount PCVGa1 is compared with its dedicated predetermined values a1, b1, and f1, and the $2^{nd}$-opening intake amount PCVGa2 is compared with its dedicated predetermined values c1, d1, e1, and f1. Thus, the change in intake amount Ga caused when the PCV valve 27 is changed from the first opening degree OP1 to the second opening degree OP2 is appropriately checked. This can enhance the accuracy of the abnormality diagnosis of the BGV apparatus.

In the present embodiment, when the $1^{st}$-opening intake amount PCVGa1 is larger than the predetermined value a1, the $2^{nd}$-opening intake amount PCVGa2 is larger than the predetermined value c1, and the change from the $1^{st}$-opening intake amount PCVGa1 to the $2^{nd}$-opening intake amount PCVGa2 is a linear change, the BGV apparatus is determined to be normal. Furthermore, when the $1^{st}$-opening intake amount PCVGa1 is equal to or less than the predetermined value a1, the $2^{nd}$-opening intake amount PCVGa2 is equal to or less than the predetermined value c1, and a change from the $1^{st}$-opening intake amount PCVGa1 to the $2^{nd}$-opening intake amount PCVGa2 is a linear change, the BGV passage 26 is determined to be abnormal due to perforation. With the above conditions, the perforation abnormality of the BGV passage 26 is readily determined. In this regard, the variously-sized perforation abnormality of the BGV passage 26 can be diagnosed with high accuracy and in a relatively short time.

In the present embodiment, furthermore, when the $2^{nd}$-opening intake amount PCVGa2 is equal to or less than the predetermined value c1 and a change from the $1^{st}$-opening intake amount PCVGa1 to the $2^{nd}$-opening intake amount PCVGa2 is a curved change, the BGV passage 26 is determined to be abnormal due to clogging. With the above conditions, the clogging abnormality of the BGV passage 26 is readily determined. In this regard, heavy or slight clogging abnormality of the BGV passage 26 can be diagnosed with high accuracy and in a relatively short time.

Fourth Embodiment

A fourth embodiment embodying the abnormality diagnosis device for the BGV apparatus according to the invention will be described in detail with reference to the accompanying drawings.

Figure 13:
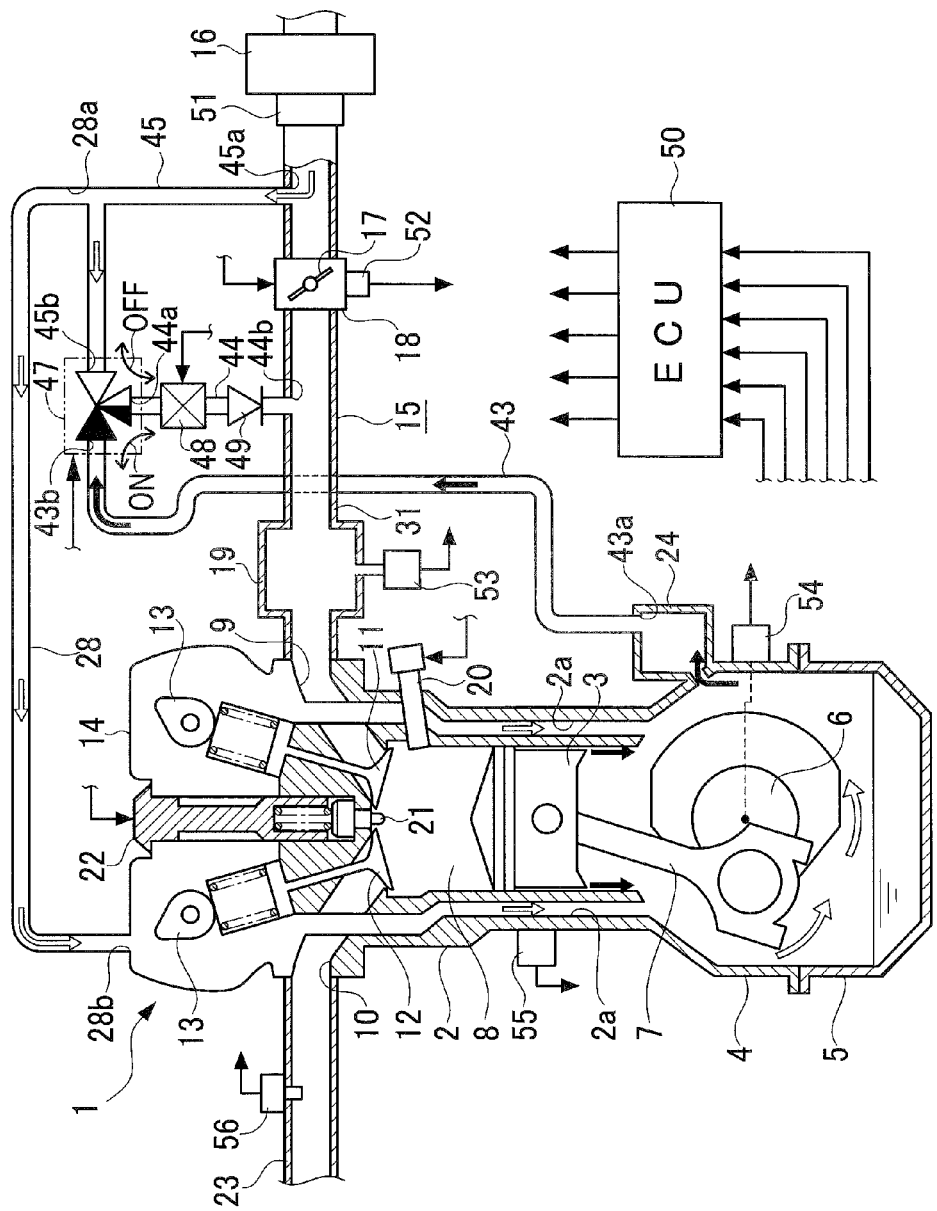
FIG. 13 is a schematic configuration diagram of a gasoline engine system in a fourth embodiment.

The fourth embodiment differs from each of the aforementioned embodiments in the mechanical structure of the BGV apparatus and the contents of the abnormality diagnosis control. FIG. 13 is a schematic configuration diagram of a gasoline engine system in the present embodiment. As shown in FIG. 13, the mechanical structure of the BGV apparatus in the present embodiment includes a first passage 43, a second passage 44, a third passage 45, a three-way changeover valve 47, a PCV valve 48, and a check valve 49 instead of the BGV passage 26 and the PCV valve 27 described above. The first passage 43a includes a first end 43a on an inlet side and a second end 43b on an outlet side. The first end 43a is communicated with the oil separator 24. The second passage 44 includes a first end 44a on an inlet side and a second end 44b on an outlet side. The second end 44b is communicated with a part of the intake passage 15 (the intake manifold 31) downstream of the electronic throttle device 18. The third passage 45 includes a first end 45a on an inlet side and the second end 45b on an outlet side. The first end 45a allows fresh air to be introduced into the engine 1. The first end 45a of the third passage 45 is communicated with a part of the intake passage 15 located between the air cleaner 16 and the electronic throttle device 18. The third passage 45 is connected to the fresh-air introduction passage 28. Specifically, the fresh-air introduction passage 28 includes a first end 28a and a second end 28b. The first end 28a is communicated with a portion of the third passage 45, while the second end 28b is communicated with the head cover 14. The three-way changeover valve 47 is placed in communication with each of the second end 43b of the first passage 43, the first end 44a of the second passage 44, and the second end 45b of the third passage 45. The three-way changeover valve 47 is configured to change over a flow passage to selectively communicate the first end 44a of the second passage 44 with the second end 43b of the first passage 43 or the second end 45b of the third passage 45. The PCV valve 48 is configured to regulate a flow rate of gas allowed to flow through the second passage 44.

The three-way changeover valve 47 is a known electrically-operated changeover valve, which is electrically turned ON to change over the flow passage to communicate the first end 44a of the second passage 44 with the second end 43b of the first passage 43. This configuration permits blow-by gas to be introduced into the part of the intake passage 15 downstream of the throttle valve 17. Further, when electrically turned OFF, the three-way changeover valve 47 changes over the flow passage to communicate the first end 44a of the second passage 44 with the second end 45b of the third passage 45. This configuration permits fresh air to be introduced into the part of the intake passage 15 downstream of the throttle valve 17. The PCV valve 48 is a known electrically-operated valve configured to have a variable opening degree. The check valve 49 is provided in the second passage 44 downstream of the PCV valve 48. This check valve 49 is configured to restrict, or block, a flow of gas toward the PCV valve 48, while permit a flow of gas in an opposite direction. Herein, the responsivity of the three-way changeover valve 47 to switch between opening and closing is generally considered to be higher than the responsivity of the PCV valve 48 to close from a predetermined opening degree to a full closed position or to open from the full closed position to the predetermined opening degree. In the present embodiment, the first passage 43 and the second passage 44 constitute the BGV passage, and the three-way changeover valve 47 and the PCV valve 48 constitute a gas flow-rate regulating unit. A part of the third passage 45 constitutes the fresh-air introduction passage 28.

In the present embodiment, the ECU 50 corresponds to one example of an abnormality diagnosis unit and a control unit of the present invention. The ECU 50 is configured to control the three-way changeover valve 47 and the PCV valve 48 according to the operating state of the engine 1 in order to selectively allow blow-by gas or fresh-air to flow in the part of the intake passage 15 downstream of the electronic throttle device 18 according to the operating state of the engine 1. The details of this control are omitted hereinafter.

Figure 14:
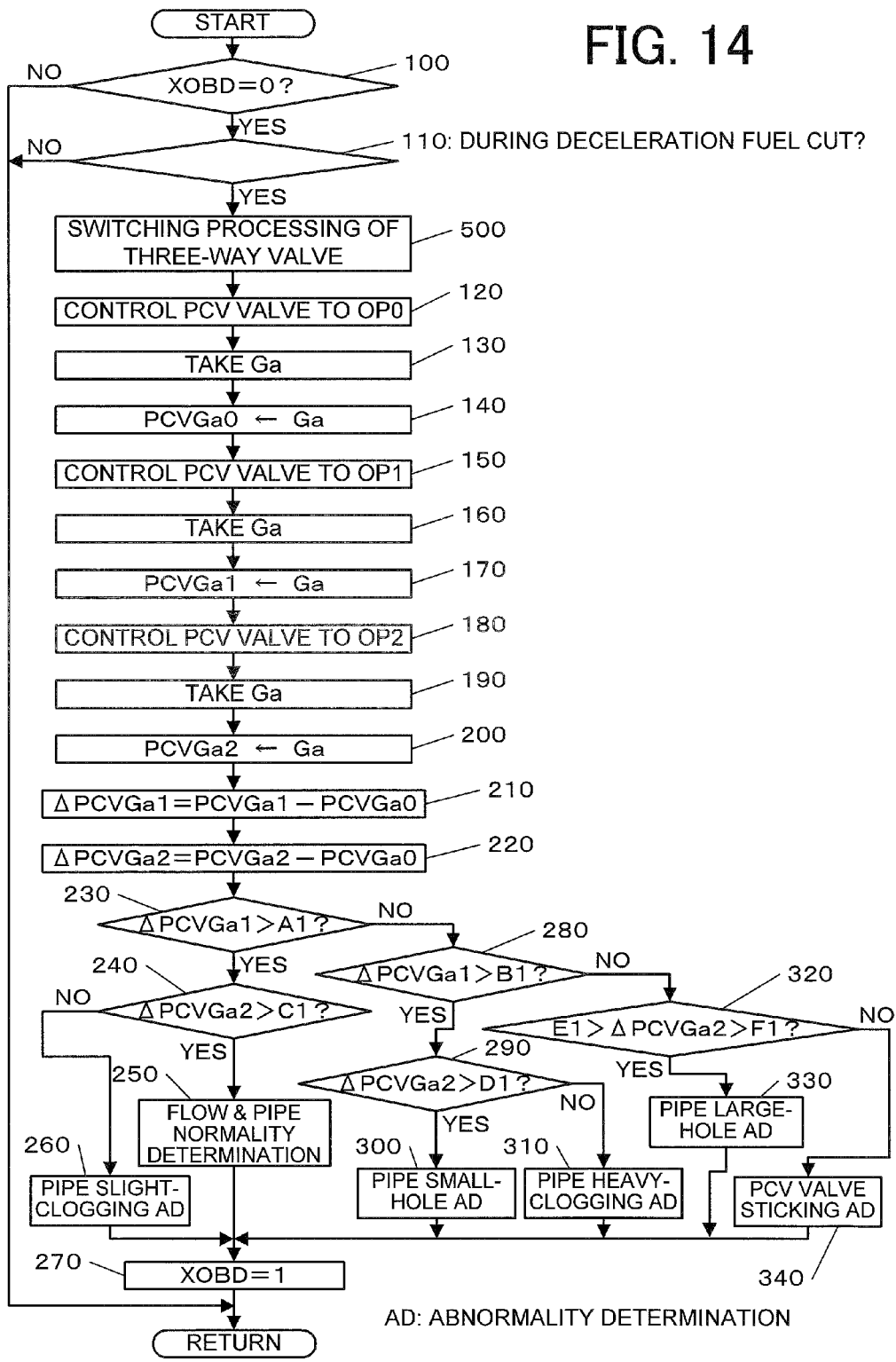
FIG. 14 is a flowchart showing contents of fourth abnormality diagnosis control in the fourth embodiment.

Next, fourth abnormality diagnosis control to be executed by the ECU 50 will be explained. FIG. 14 is a flowchart showing the contents of this abnormality diagnosis control. The flowchart in FIG. 14 differs from the flowchart in FIG. 2 in addition of step 500 between step 110 and step 120 in FIG. 2.

When the processing enters the routine, the ECU 50 executes the processings in step 100 and step 110. If YES in step 110, a changeover processing of the three-way changeover valve 47 is executed in step 500. The detailed contents of this processing are shown in a flowchart in FIG. 15.

Figure 15:
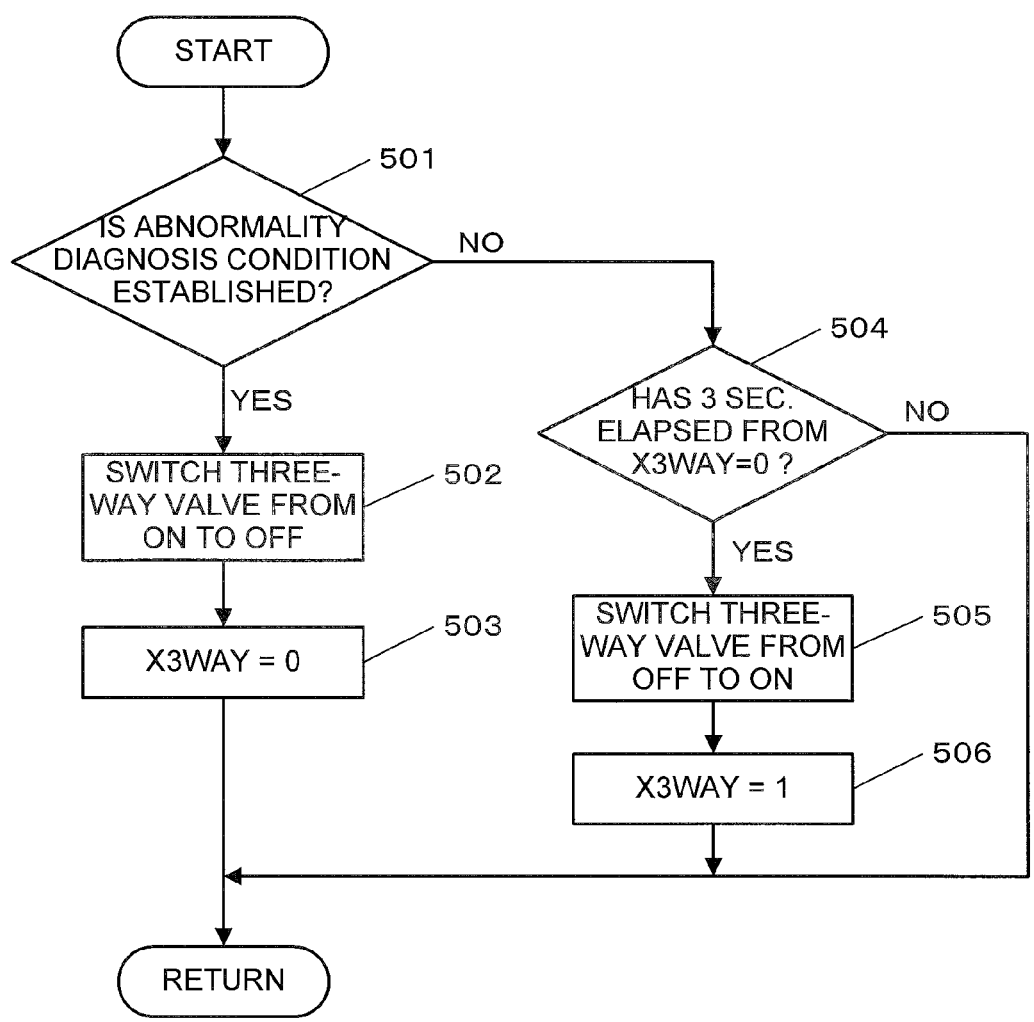
FIG. 15 is a flowchart showing contents of switching processing of a three-way changeover valve in the fourth embodiment.

In step 501, as shown in FIG. 15, the ECU 50 determines whether or not a predetermined abnormality diagnosis condition is established. Herein, for instance, the ECU 50 makes a determination of this establishment under condition that the abnormality diagnosis is uncompleted or that the deceleration and the fuel cut are being executed. The ECU 50 advances the processing to step 502 if YES in step 501 or shifts the processing to step 504 if NO in step 501.

In step 502, the ECU 50 switches the three-way changeover valve 47 from ON to OFF, thereby changing over the flow passage to communicate the first end 44a of the second passage 44 with the second end 45b of the third passage 45 in order to allow fresh air to flow to the intake passage 15 through the three-way changeover valve 47.

Successively, in step 503, the ECU 50 sets a three-way changeover flag X3WAY to 0 and returns the processing to step 501.

In step 504, alternatively, the ECU 50 whether or not 3 seconds have elapsed from when the three-way changeover flag X3WAY was changed to 0. This elapsed time, 3 seconds, is a mere example. The ECU 50 advances the processing to step 505 if YES in step 504 or returns the processing to step 501 if NO in step 504.

In step 505, the ECU 50 turns the three-way changeover valve 47 from OFF to ON, thereby changing the flow passage to communicate the first end 44a of the second passage 44 with the second end 43b of the first passage 43 in order to allow blow-by gas to flow to the intake passage 15 through the three-way changeover valve 47.

In step 506, the ECU 50 sets the changeover flag X3WAY to 1 and returns the processing to step 501.

In the aforementioned switching processing in step 500, when the engine 1 is in the deceleration fuel cut mode and the abnormality diagnosis condition is established, that is, when the abnormality of the BGV apparatus is diagnosed, the ECU 50 controls the three-way changeover valve 47 to flow fresh air, without flowing blow-by gas, to the intake passage 15.

Thereafter, in FIG. 14, the ECU 50 shifts the processing from step 500 to step 120 to execute the processings in steps 120 to 340.

According to the abnormality diagnosis device for the BGV apparatus in the present embodiment described above, the three-way changeover valve 47 is controlled according to the operating state of the engine 1. Accordingly, the first end 44a of the second passage 44 is selectively connected to the second end 43b of the first passage 43 or the second end 45b of the third passage 45 in order to selectively flow blow-by gas or fresh air to the part of the intake passage 15 (the intake manifold 31) downstream of the electronic throttle device 18 (the throttle valve 17). Consequently, the single three-way changeover valve 47 having relatively high responsivity has only to be switched on or off to selectively flow blow-by gas or fresh air into the intake passage 15. Accordingly, introduction of blow-by gas and introduction of fresh air to the intake passage 15 can be changed over with high responsivity by a relatively simple structure. As the BGV apparatus, at least one of the first to third passages 43 to 45, the three-way changeover valve 47, and the PCV valve 48 is diagnosed for abnormality. Thus, the abnormality diagnosis of the BGV apparatus can provide the operations and advantages almost equivalent to the first embodiment.

In the present embodiment, the first passage 43, the third passage 45, the three-way changeover valve 47, and the PCV valve 48 in the BGV apparatus are diagnosed for abnormality. During this abnormality diagnosis, fresh air, not blow-by gas, is allowed to flow in the intake passage 15 through the second passage 44 and the third passage 45. Thus, changes in flow rate of fresh air caused when the opening degree of the PCV valve 48 is changed from the first opening degree OP1 to the second opening degree OP2 can be made larger than changes in flow rate of blow-by gas caused when the PCV valve 48 is similarly changed. This can enhance diagnosis accuracy for perforation abnormality of the pipe(s) (the first passage 43 and the third passage 45). Moreover, during abnormality diagnosis in which no blow-by gas flows to the intake passage 15, oil mist in the crankcase 4 does not flow together with the blow-by gas to the intake passage 15. This results in a reduced amount of oil to be taken away from the crankcase 4 during abnormality diagnosis.

Fifth Embodiment

A fifth embodiment embodying the abnormality diagnosis device for the BGV apparatus according to the invention will be described below with reference to the accompanying drawings.

Figure 16:
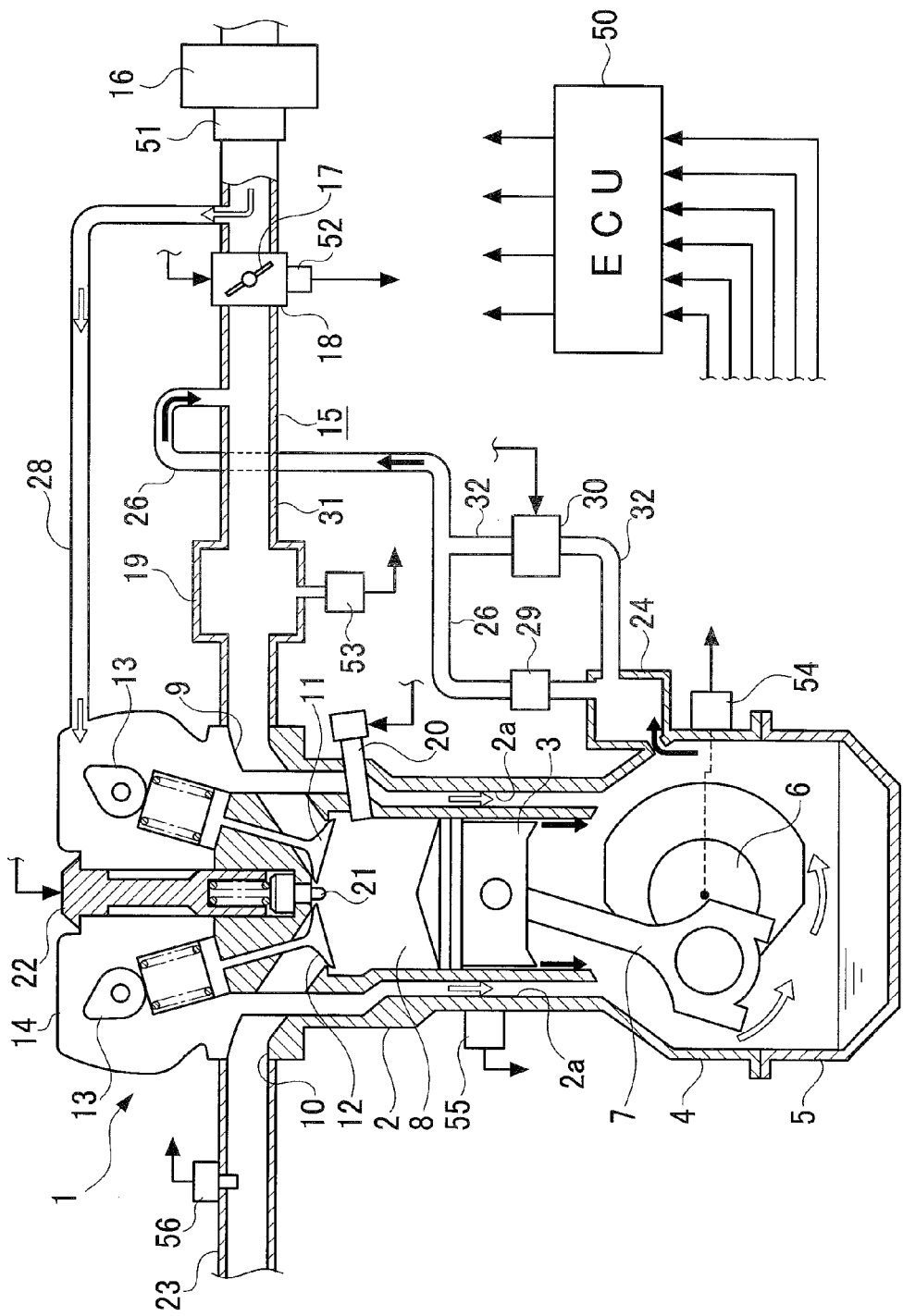
FIG. 16 is a schematic configuration diagram of a gasoline engine system in a fifth embodiment.

The fifth embodiment differs from each of the aforementioned embodiments in the mechanical structure of the BGV apparatus and the contents of abnormality diagnosis control. FIG. 16 is a schematic configuration diagram of a gasoline engine system in the present embodiment. As shown in FIG. 16, the mechanical structure of the BGV apparatus in the present embodiment includes, instead of the electrically-operated PCV valve 27 configured to have a variable opening degree, a PCV valve 29 of a non-electrically-operated pressure-sensitive type (a spring-operated type) and an electrically-operated open-close valve 30 configured simply to open and close. The PCV valve 29 is placed in the BGV passage 26 in the vicinity of the oil separator 24. A bypass passage 32 extending by detouring around the PCV valve 29 is provided between the oil separator 24 and the BGV passage 26. The open-close valve 30 is placed in this bypass passage 32. The open-close valve 30 is connected to the ECU 50 and is configured to open and close under control of the ECU 50. The open-close valve 30 is configured to close during non-energization (OFF) and open during energization (ON). In the present embodiment, the non-electrically-operated PCV valve 29 and the open-close valve 30 constitute one example of a gas flow regulating unit of the invention. Accordingly, during operation of the engine 1, the non-electrically-operated PCV valve 29 is appropriately opened and closed in response to the pressure acting on the BGV passage 26. This regulates a flow rate of blow-by gas allowed to flow from the crankcase 4 to the intake passage 15. At that time, the electrically-operated open-close valve 30 is closed, allowing the blow-by gas passing through only the PCV valve 29 to flow in the BGV passage 26. In contrast, when the open-close valve 30 is opened, allowing blow-by gas having passed through the open-close valve 30 to flow in the bypass passage 32. Thus, the blow-by gas having passed through both the PCV valve 29 and the open-close valve 30 flows in the intake passage 15. The blow-by gas flow rate at that time is larger than the blow-by gas flow rate detected when the open-close valve 230 is closed. In the present embodiment, specifically, when the open-close valve 30 is opened and closed, a low flow rate of blow-by gas and a high flow rate of blow-by gas are selectively allowed to flow in the BGV passage 26.

Figure 17:
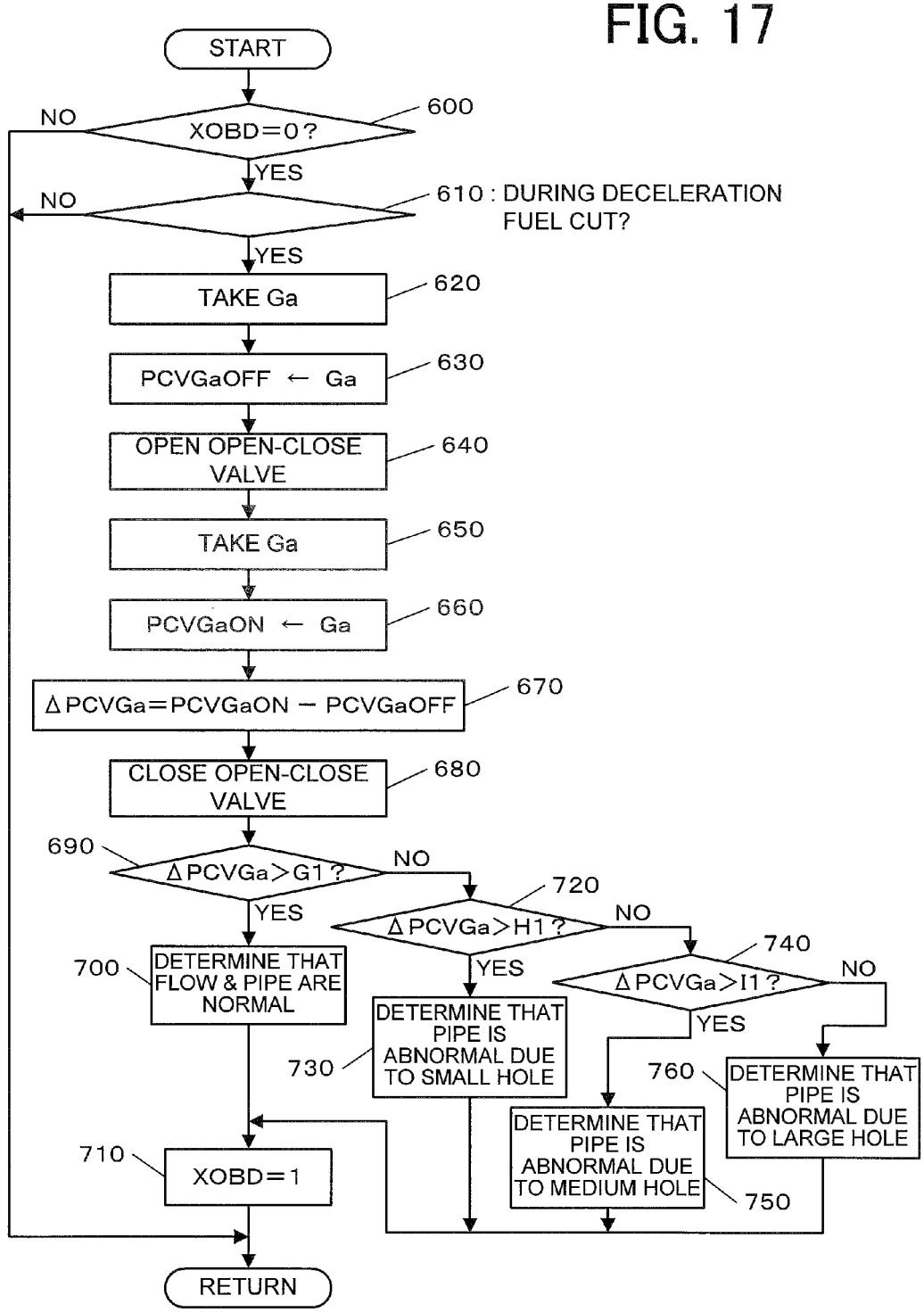
FIG. 17 is a flowchart showing contents of fifth abnormality diagnosis control in the fifth embodiment.
Figure 18:
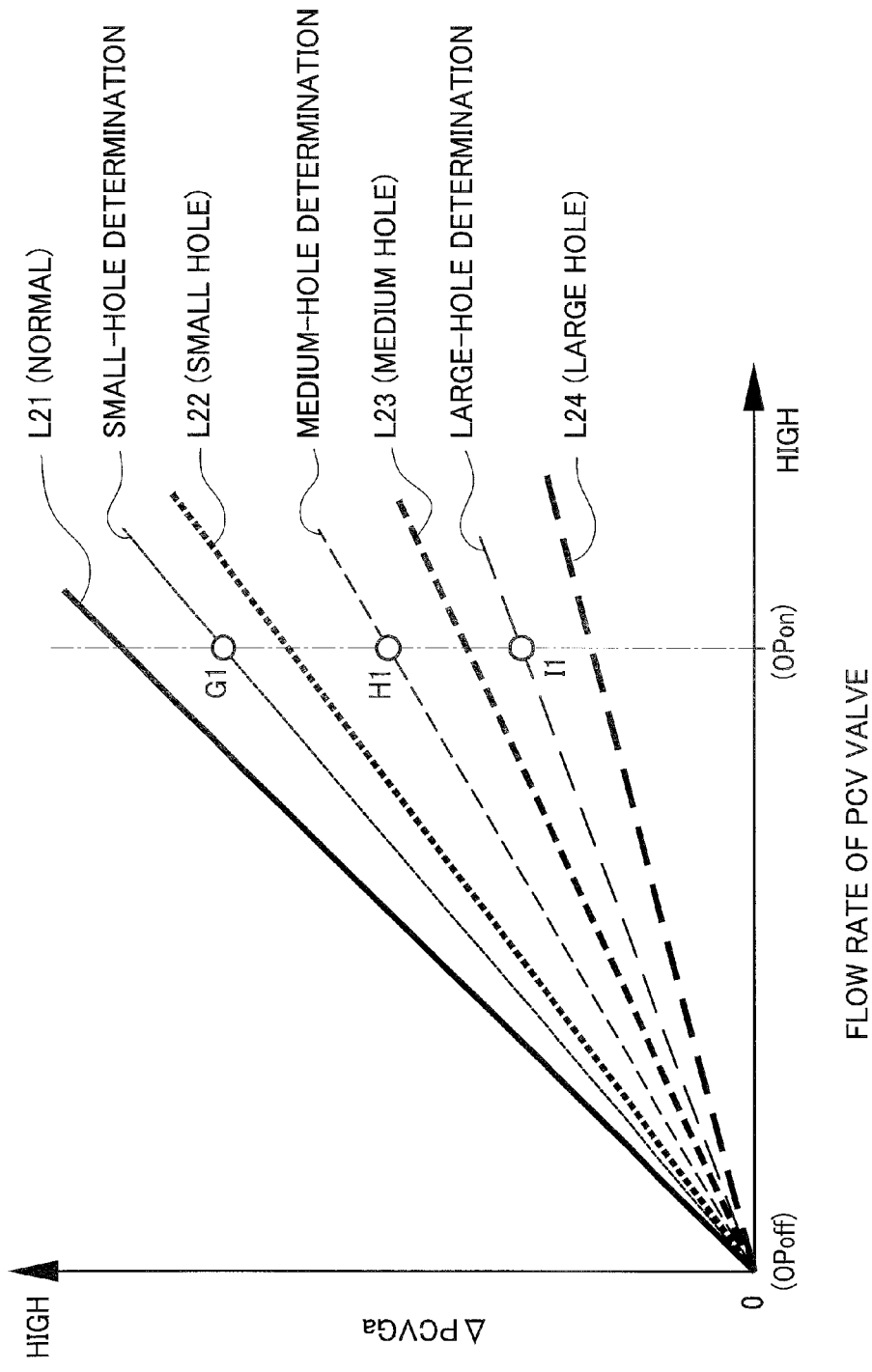
FIG. 18 is a graph showing fifth determination data for abnormality diagnosis in the fifth embodiment.

Next, fifth abnormality diagnosis control to be executed by the ECU 50 will be described. FIG. 17 is a flowchart showing the contents of the abnormality diagnosis control. FIG. 18 is a graph showing fifth determination data to be used for this abnormality diagnosis.

When the processing enters the routine shown in FIG. 17, the ECU 50 determines in step 600 whether or not an abnormality diagnosis flag XOBD is 0, that is, whether or not the abnormality diagnosis has been unexecuted. The ECU 50 advances the processing to step 610 if YES in step 600, indicating that the abnormality diagnosis has been unexecuted, or returns the processing to step 600 if NO in step 600, indicating that the abnormality diagnosis has been executed.

In step 610, the ECU 50 checks whether or not the deceleration fuel cut is being executed. The ECU 50 advances the processing to step 620 if YES in step 610 or returns the processing to step 600 if NO in step 610.

In step 620, the ECU 60 takes the intake amount Ga detected when the open-close valve 30 is in a closed (OFF) state from the detection value of the air flow meter 51. The open-close valve 30 is in the closed state during non-energization (OFF). At that time, a low flow rate of blow-by gas having passed through only the PCV valve 29 is allowed to flow in the BGV passage 26.

In step 630, the ECU 50 then sets the intake amount Ga read in step 620 as a valve-closed intake amount PCVGaOFF. This valve-closed intake amount PCVGaOFF corresponds to one example of a first intake amount of the invention.

In step 640, the ECU 50 switches the open-close valve 30 to an open state (ON). Herein, when the open-close valve 30 is open, a high flow rate of blow-by gas having passed through the PCV valve 29 and the open-close valve 30 is allowed to flow in the BGV passage 26.

In step 650, the ECU 50 takes the intake amount Ga when the open-close valve 30 is opened (ON) from the detection value of the air flow meter 51.

In step 660, the ECU 50 sets the intake amount Ga read in step 650 as a valve-open intake amount PCVGaON. This valve-open intake amount PCVGaON corresponds to one example of a second intake amount of the invention.

In step 670, the ECU 50 calculates, as a valve-open intake increased amount ΔPCVGa, a difference between the valve-open intake amount PCVGaON and the valve-closed intake amount PCVGaOFF. Specifically, assuming the valve-closed intake amount PCVGaOFF as a reference intake amount, an increased amount of the valve-open intake amount PCVGaON from the reference intake amount is calculated.

In step 680, the ECU 50 successively switches the open-close valve 30 to a closed state (OFF). In step 690, the ECU 50 then determines whether or not the valve-open intake increased amount ΔPCVGa is larger than a predetermined value G1. The ECU 50 advances the processing to step 700 if YES in step 680 or shifts the processing to step 720 if NO in step 680.

In step 700, the ECU 50 determines that the flow rate of blow-by gas and the pipe (the BGV passage 26) are normal (Normality Determination). The ECU 50 can store this normality determination in the memory.

The above determination will be explained referring to the fifth determination data shown in FIG. 18. In the graph in FIG. 18, a horizontal axis indicates a flow rate of the open-close valve 30, i.e., a flow rate of blow-by gas flowing through the open-close valve 30, and the vertical axis indicates values of the valve-open intake increased amount ΔPCVGa. A point (OPoff) in the horizontal axis indicates a flow rate detected when the open-close valve 30 is closed (OFF) and a point (OPon) indicates a flow rate detected when the open-close valve 30 is open (ON). In the present embodiment, the point OPoff is assumed to be 0 for convenience. Specifically, the affirmative determination result in step 690 indicates that the valve-open intake increased amount ΔPCVGa is larger than the predetermined value G1. It is thus considered that the valve-open intake increased amount ΔPCVGa in FIG. 18 linearly changes as shown by a straight line (a thick line) L21 (Normal) which is located above a broken line indicating small-hole determination and passing through the origin, and passes through the origin. In this case, the flow rate of blow-by gas and the pipe(s) (the BGV passage 26) are considered to be normal.

In step 710, the ECU 50 then sets the abnormality diagnosis flag XOBD to 1 and returns the processing to step 600.

Alternately, in step 720 following step 690, the ECU 50 judges whether or not the valve-open intake increased amount ΔPCVGa is larger than a predetermined value H1 (<G1). The ECU 50 advances the processing to step 730 if YES in step 720 or shifts the processing to step 740 if NO in step 720.

In step 730, the ECU 50 determines that the pipe (the BGV passage 26) for blow-by gas is perforated with a small or tiny hole(s) (Small Hole), namely, that a small-hole abnormality has occurred, and shifts the processing to step 710. The ECU 50 can store this abnormality determination in the memory and execute a predetermined informing operation.

Specifically, the affirmative determination result in step 720 indicates that the valve-open intake increased amount ΔPCVGa is equal to or less than the predetermined value G1 and larger than the predetermined value H1. It is thus considered that the valve-open intake increased amount ΔPCVGa in FIG. 18 linearly changes as shown by a straight line (a broken line) L22 (Small Hole) which is located above a broken line for medium-hole determination and passes through the origin and below a broken line for small-hole determination, the line L22 passing through the origin. In this case, the pipe (the BGV passage 26) for blow-by gas can be determined to be abnormal due to small hole.

Alternatively, in step 740 following the step 720, the ECU 50 determines whether or not the valve-open intake increased amount ΔPCVGa is larger than a predetermined value I1 (<H1). The ECU 50 advances the processing to step 750 if YES in step 740 or shifts the processing to step 760 if NO in step 740.

In step 750, the ECU 50 decides that the pipe for blow-by gas is perforated with a medium hole(s), namely, that a medium hole abnormality has occurred, and shifts the processing to step 710. The ECU 50 can store this abnormality determination in the memory and execute a predetermined informing operation.

Specifically, the affirmative determination result in step 740 indicates that the valve-open intake increased amount ΔPCVGa is equal to or less than the predetermined value H1 and larger than the predetermined value I1. It is thus considered that the valve-open intake increased amount ΔPCVGa in FIG. 18 linearly changes as shown by a straight line (a broken line) L23 (Medium Hole) which is located above a broken line for large-hole determination passing through the origin and below a broken line for medium-hole determination, and passes through the origin. In this case, the pipe (the BGV passage 26) for blow-by gas is determined to be abnormal due to medium hole.

In step 760, alternatively, the ECU 50 determines that the pipe for blow-by gas is perforated with a large hole(s), namely, that a large-hole abnormality has occurred, and shifts the determination to step 710. The ECU 50 can store this abnormality determination in the memory and execute a predetermined informing operation.

Specifically, the negative determination result in step 740 indicates that the valve-open intake increased amount ΔPCVGa is equal to or less than the predetermined value I1. It is thus considered that the valve-open intake increased amount ΔPCVGa in FIG. 18 linearly changes as shown by a straight line (a broken line) L24 (Large Hole) which is located below a broken line for large-hole determination and passes through the origin. In this case, the pipe (the BGV passage 26) for blow-by gas is determined to be abnormal due to large hole.

According to the abnormality diagnosis device for the BGV apparatus in the present embodiment described above, the operations and advantages almost equivalent to those in the first embodiment can be obtained. In the present embodiment, specifically, the difference between the valve-open intake amount PCVGaON detected when the open-close valve 30 is opened and the valve-closed intake amount PCVGaOFF detected when the open-close valve 30 is closed, namely, the valve-open intake increased amount ΔPCVGa, can be obtained as a relatively large value. Therefore, a flow-rate change needed for perforation abnormality determination, such as variously-sized holes in the pipe (the BGV passage 26) of the BGV apparatus, can be reliably generated. This results in accurate diagnosis on variously-sized perforation abnormality of the pipe (the BGV passage 26). Further, for enhancing the accuracy of this abnormality determination, it is unnecessary to take much time for determination and the abnormality diagnosis can be carried out in a relatively short time.

In the present embodiment, the gas flow regulating unit of the invention to regulate a flow rate of blow-by gas is constituted of the non-electrically-operated pressure-sensitive type (the spring-operated type) PCV valve 29 and the electrically-operated open-close valve 30 configured to simply open and close, not the electrically-operated PCV valve 27 having a variable opening degree. Thus, the gas flow regulating unit can be provided at lower cost than when it is constituted of the PCV valve 27.

Sixth Embodiment

A sixth embodiment embodying the abnormality diagnosis device for the BGV apparatus according to the invention will be described in detail with reference to the accompanying drawings.

The present embodiment differs from the fifth embodiment in the mechanical structure of the BGV apparatus. In the fifth embodiment, for diagnosis of abnormality of the BGV apparatus, the open-close valve 30 is opened and closed to regulate the flow rate of blow-by gas allowed to flow in the BGV passage 26 to a low flow rate or a high flow rate. Accordingly, when the blow-by gas flow rate is regulated to a high flow rate, the amount of oil mist taken away from the crankcase 4 is also increased, resulting in the tendency to increase engine oil consumption. This configuration has a limitation in achieving both advantages, i.e., enhanced accuracy of abnormality diagnosis and reduced engine oil consumption. For this purpose, the abnormality diagnosis device in the sixth embodiment is configured to obtain both advantages, that is, enhanced accuracy of abnormality diagnosis and reduced engine oil consumption.

Figure 19:
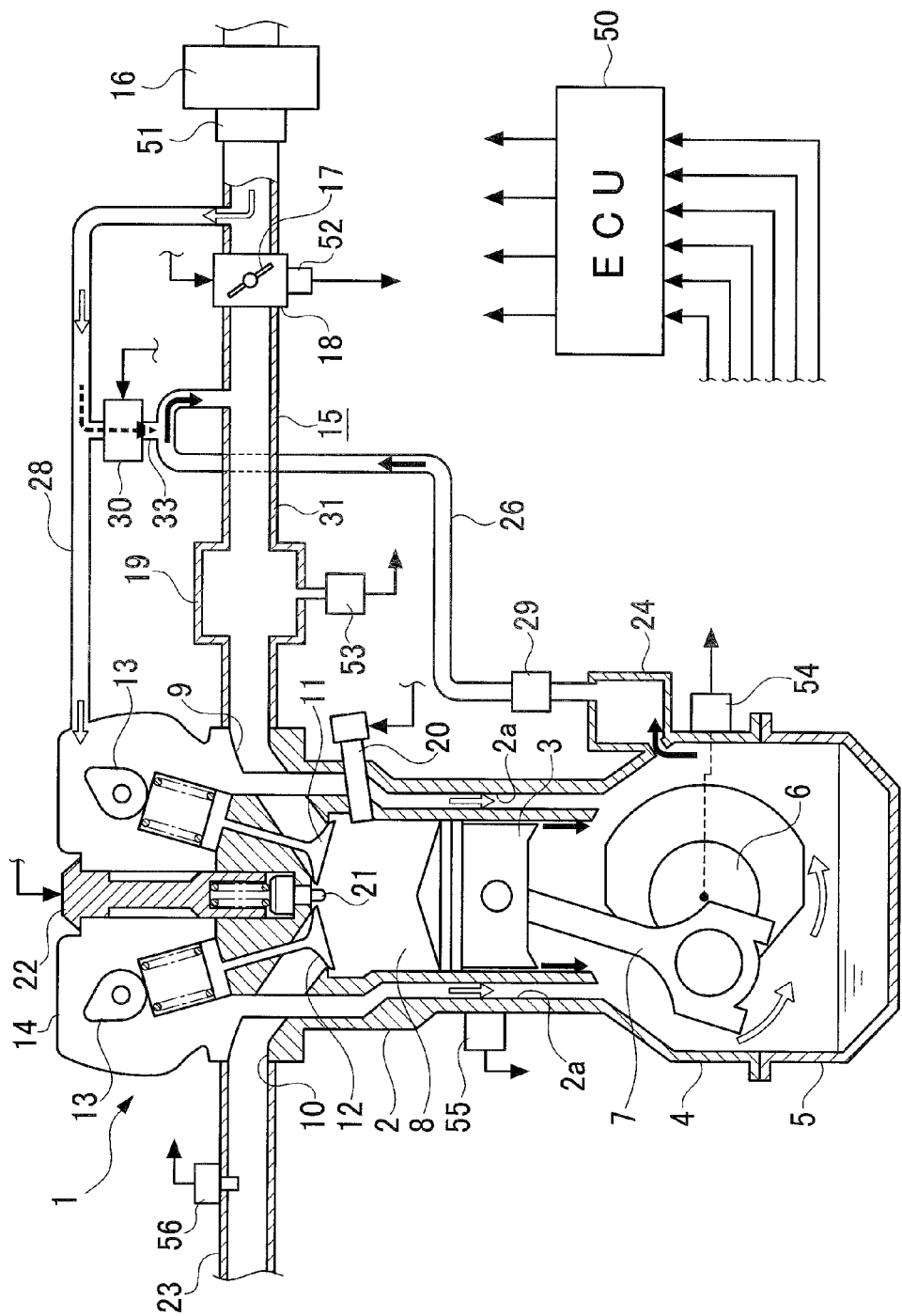
FIG. 19 is a schematic configuration diagram of a gasoline engine system in a sixth embodiment.

FIG. 19 is a schematic configuration diagram of a gasoline engine system in the sixth embodiment. The BGV apparatus in the present embodiment also includes, as shown in FIG. 19, the PCV valve 29 of a non-electrically-operated pressure-sensitive type (a spring-operated type) and the electrically-operated open-close valve 30 configured simply to open and close, instead of the electrically-operated PCV valve 27 configured to have a variable opening degree. The PCV valve 29 is placed in the BGV passage 26 in the vicinity of the oil separator 24. Further, a communication passage 33 is provided, near the intake passage 15, between the BGV passage 26 and the fresh air introduction passage 28 to provide communication between those passages 26 and 28. The open-close valve 30 is placed in the communication passage 33. The open-close valve 30 is controlled by the ECU 50 to open and close. In the present embodiment, the PCV valve 29 corresponds to one example of a gas flow regulating valve of the invention. During operation of the engine 1, accordingly, the non-electrically-operated PCV valve 29 is appropriately opened and closed in response to the pressure acting on the BGV passage 26. Thus, the flow rate of blow-by gas allowed to flow from the crankcase 4 to the intake passage 15 is regulated. At this time, when the electrically-operated open-close valve 30 is closed, the blow-by gas having passed through the PCV valve 29 flows through the PCV valve 26 as indicated by black arrows in FIG. 19. In contrast, when the open-close valve 30 is opened, the blow-by gas having passed through the PCV valve 29 flows through the PCV valve 26 as indicated by the black arrows in FIG. 19 and also a part of fresh air (indicated by white arrows) flowing through the fresh-air introduction passage 28 flows in the communication passage 33 as indicated by a broken arrow in FIG. 19, the fresh air flows together with the blow-by gas into the intake passage 15. The blow-by gas flow rate at the moment is almost equal to the blow-by gas flow rate provided when the open-close valve 30 is in a closed state.

For abnormality diagnosis control, the present embodiment can also adopt the contents of the fifth abnormality diagnosis control in FIG. 17 and the fifth determination data in FIG. 18. In the present embodiment, the ECU 50 also corresponds to one example of an abnormality diagnosis unit of the invention.

In the present embodiment, therefore, the operations and advantages almost equivalent to those in the fifth embodiment can be obtained. In the present embodiment, additionally, when the open-close valve 30 is opened, the blow-by gas flow rate flowing in the intake passage 15 does increase and rather the fresh air flowing through the fresh-air introduction passage 28, instead of the blow-by gas, is caused to flow in the intake passage 15. Accordingly, even when the open-close valve 30 is opened, the blow-by gas flow rate from the crankcase 4 does not increase and thus the amount of oil mist taken away from the crankcase 4 does not increase. This can result in a reduction in engine oil consumption and thus achieve both advantages, that is, enhanced accuracy of abnormality diagnosis and reduced engine oil consumption.

Seventh Embodiment

Next, a seventh embodiment embodying the abnormality diagnosis device for the BGV apparatus according to the invention will be described with the accompanying drawings.

Figure 20:
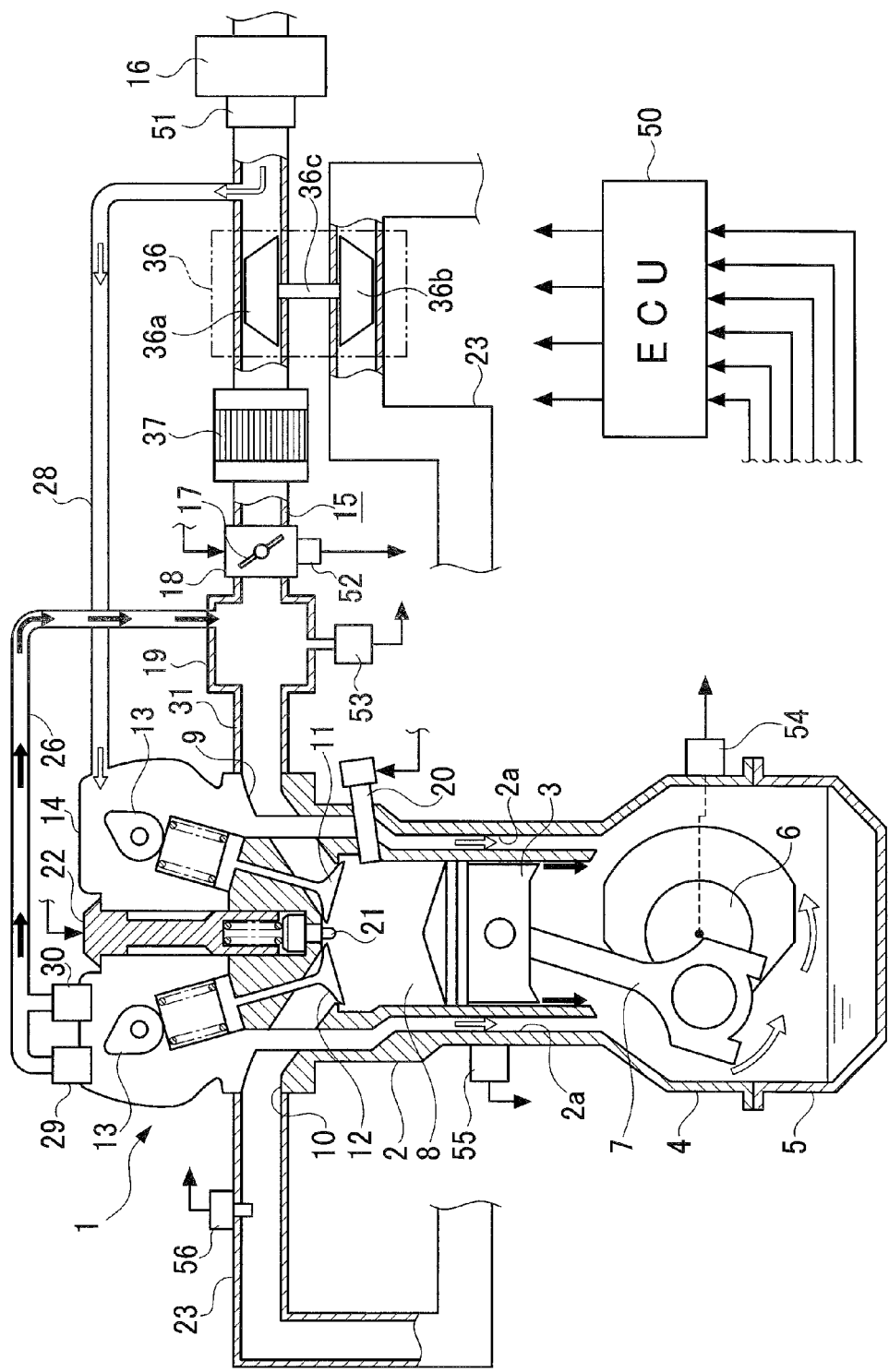
FIG. 20 is a schematic configuration diagram of a gasoline engine system in a seventh embodiment.

The seventh embodiment differs from the fifth embodiment in the mechanical structures of the engine system and the BGV apparatus. FIG. 20 is a schematic configuration diagram of a gasoline engine system in the seventh embodiment. As shown in FIG. 20, this gasoline engine system is provided with a known supercharger 36. This supercharger 36 includes a compressor 36a placed in the intake passage 15 between the electronic throttle device 18 and the air flow meter 51, a turbine 36b placed in the exhaust passage 23, and a rotary shaft 36c connecting the compressor 36a and the turbine 36b so that they are integrally rotatable. Further, a known intercooler 37 is placed in the intake passage 15 between the compressor 36a and the electronic throttle device 18.

The BGV apparatus in the present embodiment also includes the PCV valve 29 of a non-electrically-operated pressure-sensitive type (a spring-operated type) and the electrically-operated open-close valve 30 configured simply to open and close, instead of the electrically-operated PCV valve 27 configured to have a variable opening degree. The PCV valve 29 and the open-close valve 30 are separately provided in the head cover 14. These PCV valve 29 and open-close valve 30 are connected in parallel with each other to the BGV passage 26. Specifically, the PCV valve 29 and the open-close valve 30 in the head cover 14 are connected in parallel with each other to an inlet of the BGV passage 26. An outlet of the BGV passage 26 is connected to the surge tank 19. In this case, the blow-by gas stored in the crankcase 4 flows in the head cover 14 through the communication passage 2a and further flows from the head cover 14 to the surge tank 19 through the PCV valve 29, the open-close valve 30, and the BGV passage 26. An inlet of the fresh-air introduction passage 28 is connected to a part of the intake passage 15 upstream of the compressor 36a. The open-close valve 30 is controlled by the ECU 50 to open and close. In the present embodiment, the non-electrically-operated PCV valve 29 and the open-close valve 30 constitute one example of a gas flow regulating unit of the invention.

For the abnormality diagnosis control, the present embodiment can also adopt the contents of the fifth abnormality diagnosis control in FIG. 17 and the fifth determination data in FIG. 18. In the present embodiment, the ECU 50 corresponds to one example of the abnormality diagnosis unit of the invention.

In the present embodiment, consequently, for the gasoline engine system provided with the supercharger 36, the operations and advantages almost equivalent to those in the fifth embodiment can be obtained.

The present invention is not limited to each of the aforementioned embodiments and the present invention may be embodied in other specific forms without departing from the essential characteristics thereof.

Figure 21:
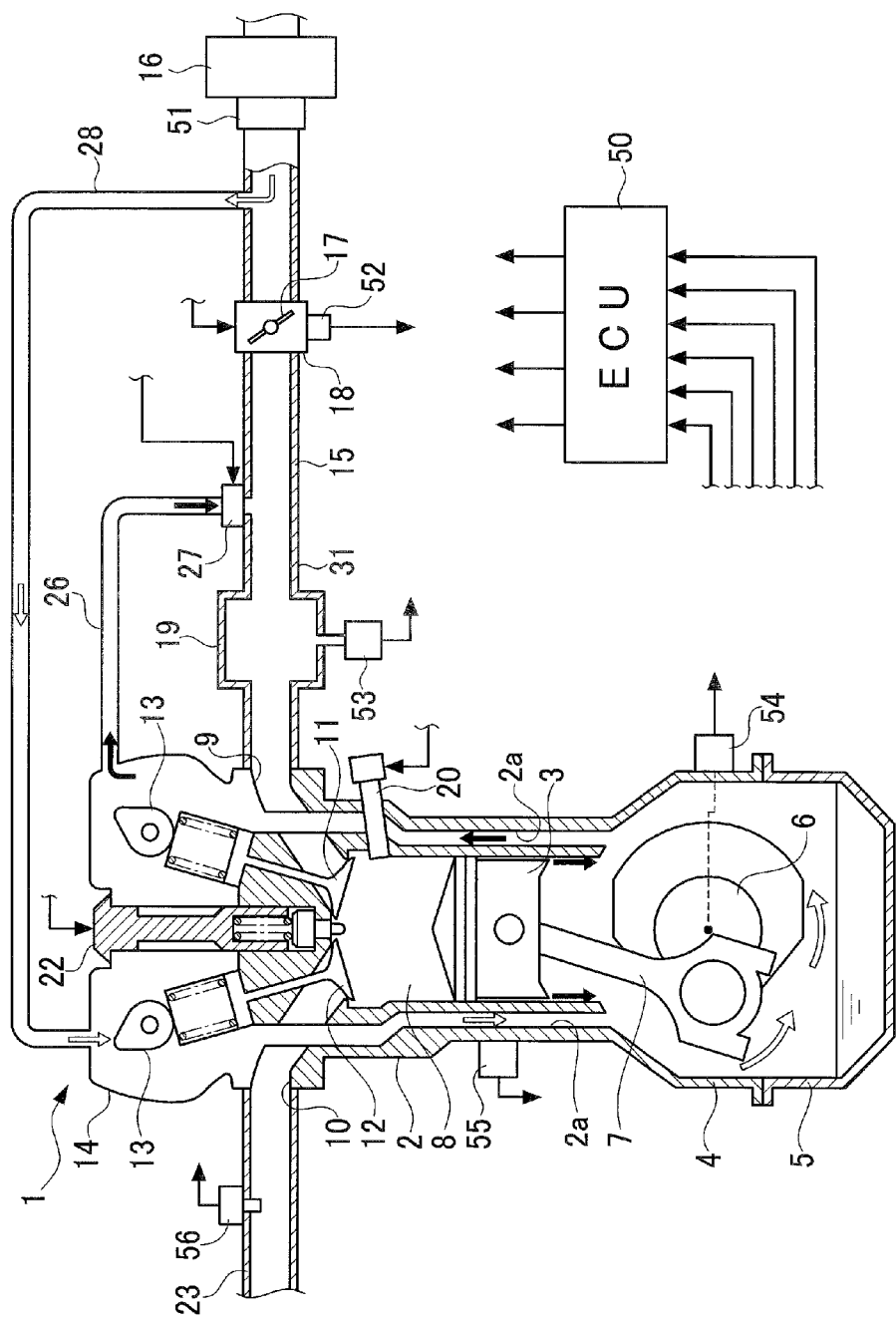
FIG. 21 is a schematic configuration diagram of a gasoline engine system in another embodiment.

In the first embodiment, the inlet of the BGV passage 26 is connected to the oil separator 24 provided in the crankcase 4. In contrast, as shown in a schematic configuration diagram of a gasoline engine system in FIG. 21, the inlet of the BGV passage 26 may be connected to the head cover 14. In this case, the blow-by gas stored in the crankcase 4 flows in the head cover 14 through the communication passage 2a and further flows from the head cover 14 to the intake passage 15 through the BGV passage 26.

In the first to third embodiments described above, the PCV valve 27 is directly mounted on the intake manifold 31. As an alternative, the PCV valve may be connected to the intake passage (the intake manifold) through a pipe and so on.

The second embodiment is configured, as with the first embodiment, to diagnose abnormality of the BGV based on the $1^{st}$-opening intake increased amount $\Delta PCVGa1$ and the $2^{nd}$-opening intake increased amount $\Delta PCVGa2$; however, it may be configured to diagnose abnormality of the BGV apparatus based on the $1^{st}$-opening intake amount $PCVGa1$ and the $2^{nd}$-opening intake amount $PCVGa2$ as with the third embodiment.

In each of the above-described embodiments, the abnormality of the BGV apparatus is diagnosed based on the first intake amount detected when the gas flow regulating unit is controlled to the first opening degree and the second intake amount detected when the gas flow regulating unit is controlled to the second opening degree. As an alternative, the scope of the invention can include a configuration using a third intake amount and others detected when the gas flow regulating unit is controlled to a third opening degree and others so that the diagnosis on abnormality of the BGV apparatus is executed based on three or more detected intake amounts corresponding to three or more opening degrees.

In the fifth to seventh embodiments, the configuration of regulating a flow rate of blow-by gas is provided as the PCV valve 29 of a non-electrically-operated pressure-sensitive type (a spring-operated type) and the electrically-operated open-close valve 30 configured simply to be open and closed. As an alternative, the configuration of regulating the blow-by gas flow rate may be provided as an electrically-operated PCV valve configured to have a variable opening degree and an electrically-operated open-close valve.

INDUSTRIAL APPLICABILITY

The present invention is applicable to a BGV apparatus provided in a gasoline engine and others.

REFERENCE SIGNS LIST

1 Engine
4 Crankcase (Blowby-gas storage unit)
14 Head cover (Blowby-gas storage unit)
15 Intake passage
18 Electronic throttle device (Intake amount regulating unit)
26 BGV passage (Blowby-gas returning passage)
27 PCV valve (Gas flow regulating unit)
29 PCV valve (Gas flow regulating unit, Gas flow regulating valve)
30 Open-close valve (Gas flow regulating unit)
32 Bypass passage (Gas flow regulating unit)
33 Communication passage
43 First passage (Blowby-gas returning passage)
43a First end (Inlet side)
43b Second end (Outlet side)
44 Second passage (Blowby-gas returning passage)
44a First end (Inlet side)
44b Second end (Outlet side)
45 Third passage
45a First end (Inlet side)
45b Second end (Outlet side)
47 Three-way changeover valve (Gas flow regulating unit)
48 PCV valve (Gas flow regulating unit)
50 ECU (Abnormality diagnosis unit, Control unit, Air-fuel ratio calculating unit)
51 Air flow meter (Intake amount detecting unit)
56 Oxygen sensor (Air-fuel ratio calculating unit)
Ga Intake amount
OP0 Zero opening degree
OP1 First opening degree
OP2 Second opening degree
PCVGa0 0-opening intake amount (Zeroth intake amount)
PCVGa1 $1^{st}$-opening intake amount (First intake amount)
PCVGa2 $2^{nd}$-opening intake amount (Second intake amount)
ΔPCVGa1 $1^{st}$-opening intake increased amount (First intake increased amount)
ΔPCVGa2 $2^{nd}$-opening intake increased amount (Second intake increased amount)
a1 Predetermined value (First predetermined value)
c1 Predetermined value (Second predetermined value)
A1 Predetermined value (Third predetermined value)
C1 Predetermined value (Fourth predetermined value)
PCVGaOFF Valve-closed intake amount
PCVGaON Valve-open intake amount
ΔPCVGa Valve-open intake increased amount

What is claimed is:

1. An abnormality diagnosis device for diagnosing an abnormality of a blow-by gas returning apparatus configured to allow blow-by gas generated in an engine to flow to an intake passage and return to the engine,
the engine being configured to generate drive power when receiving supply of fuel, the supply of fuel being shut off during deceleration,
the blow-by gas returning apparatus comprising:
a blow-by gas storage unit configured to store blow-by gas generated in the engine;
an intake amount regulating valve provided in the intake passage and configured to regulate an amount of intake air flowing in the intake passage;
a blow-by gas returning passage configured to allow blow-by gas stored in the blow-by gas storage unit to flow in the intake passage downstream of the intake amount regulating valve and return to the engine; and
a gas flow regulating unit configured to have a variable opening degree to regulate a flow rate of blow-by gas in the blow-by gas returning passage,
wherein the abnormality diagnosis device comprises:
an intake amount detecting unit placed in the intake passage upstream of the intake amount regulating valve and configured to detect an amount of intake air; and
an abnormality diagnosis unit configured to diagnose abnormality of the blow-by gas returning apparatus,
wherein the abnormality diagnosis unit is configured to:
control the gas flow regulating unit to a first opening degree and a second opening degree that is larger than the first opening degree, when the engine is during deceleration and the supply of fuel to the engine is shut off, and
diagnose the abnormality of the blow-by gas returning apparatus based on a first intake amount detected by the intake amount detecting unit when the gas flow regulating unit is controlled to the first opening degree and a second intake amount detected by the intake amount detecting unit when the gas flow regulating unit is controlled to the second opening degree.

2. The abnormality diagnosis device for a blow-by gas returning apparatus according to claim 1, wherein the abnormality diagnosis unit is further configured to compare the first intake amount with a first predetermined value and compare the second intake amount with a second predetermined value larger than the first predetermined value, and diagnose abnormality of the blow-by gas returning apparatus based on comparison results of the values.

3. The abnormality diagnosis device for a blow-by gas returning apparatus according to claim 2, wherein
the abnormality diagnosis unit is further configured to:
determine that the blow-by gas returning apparatus is normal when the first intake amount is larger than the first predetermined value and the second intake amount is larger than the second predetermined value, and a change from the first intake amount to the second intake amount is a linear change; and
determine that the blow-by gas returning passage is abnormal due to perforation when the first intake amount is equal to or less than the first predetermined value and the second intake amount is equal to or less than the second predetermined value, and a change from the first intake amount to the second intake amount is a linear change.

4. The abnormality diagnosis device for a blow-by gas returning apparatus according to claim 3, wherein the abnormality diagnosis unit is further configured to determine that the blow-by gas returning passage is abnormal due to clogging when the second intake amount is equal to or less than the second predetermined value and a change from the first intake amount to the second intake amount is a curved change.

5. The abnormality diagnosis device for a blow-by gas returning apparatus according to claim 1, wherein
the abnormality diagnosis unit is further configured to:
further control the gas flow regulating unit to a zero opening degree;
calculate, as a first intake increased amount, a difference between the first intake amount and a zeroth intake amount detected by the intake amount detecting unit when the gas flow regulating unit is controlled to the zero opening degree;
calculate, as a second intake increased amount, a difference between the second intake amount and the zeroth intake amount;
compare the first intake increased amount with a third predetermined value and compare the second intake increased amount with a fourth predetermined value larger than the third predetermined value, and
diagnose abnormality of the blow-by gas returning apparatus based on comparison results of the values.

6. The abnormality diagnosis device for a blow-by gas returning apparatus according to claim 5, wherein
the abnormality diagnosis unit is further configured to:
determine that the blow-by gas returning apparatus is in a normal state when the first intake increased amount is larger than the third predetermined value and the second intake increased amount is larger than the fourth predetermined value, and a change from the first intake increased amount to the second intake increased amount is a linear change; and
determine that the blow-by gas returning passage is abnormal due to perforation when the first intake increased amount is equal to or less than the third predetermined value and the second intake increased amount is equal to or less than the fourth predetermined value, and a change from the first intake increased amount to the second intake increased amount is a linear change.

7. The abnormality diagnosis device for a blow-by gas returning apparatus according to claim 6, wherein the abnormality diagnosis unit is further configured to determine that the blow-by gas returning passage is abnormal due to clogging when the second intake increased amount is equal to or less than the fourth predetermined value and a change from the first intake increased amount to the second intake increased amount is a curved change.

8. The abnormality diagnosis device for a blow-by gas returning apparatus according to claim 1, wherein
the abnormality diagnosis unit further includes an air-fuel ratio calculating unit configured to calculate an air-fuel ratio in the engine, and
the abnormality diagnosis unit is further configured to diagnose the blow-by gas returning apparatus based on a difference of the air-fuel ratio calculated by the air-fuel ratio calculated unit from a reference value in combination with abnormality diagnosis based on the intake amount detected by the intake amount detecting unit.

9. The abnormality diagnosis device for a blow-by gas returning apparatus according to claim 1, wherein the gas flow regulating unit is an electrically-operated PCV valve having a variable opening degree, the gas flow regulating unit being directly mounted on a pipe forming the intake passage.

10. The abnormality diagnosis device for a blow-by gas returning apparatus according to claim 1, wherein
the blow-by gas returning apparatus comprises:
a first passage including a first end and a second end, the first end being communicated with the blow-by gas storage unit;
a second passage including a first end and a second end, the second end being communicated with a part of the intake passage downstream of the intake amount regulating valve;
a third passage including a first end and a second end and being configured to introduce fresh air through the first end;
a three-way changeover valve provided between the second end of the first passage, the first end of the second passage, and the second end of the third passage, and configured to be switched to selectively communicate the first end of the second passage with one of the second end of the first passage and the second end of the third passage;
an electrically-operated PCV valve configured to have a variable opening degree to regulate a flow rate of gas allowed to flow in the second passage; and
a control unit configured to control the three-way changeover valve and the PCV valve,
wherein the control unit is configured to control the three-way changeover valve and the PCV valve according to an operating state of the engine to selectively allow one of the blow-by gas and the fresh air to flow in the intake passage downstream of the intake amount regulating valve according to the operating state of the engine, and
the first passage and the second passage form the blow-by gas returning passage, and the three-way changeover valve and the PCV valve constitute the gas flow regulating unit.

11. The abnormality diagnosis device for a blow-by gas returning apparatus according to claim 10, wherein the control unit is configured to control the three-way changeover valve to communicate the first end of the second passage with the second end of the third passage to allow the fresh air to flow into the intake passage when the blow-by gas returning apparatus is diagnosed as being abnormal.

12. The abnormality diagnosis device for a blow-by gas returning apparatus according to claim 1, wherein the gas flow regulating unit includes: a non-electrically-operated pressure sensitive PCV valve placed in the blow-by gas returning passage; a bypass passage provided to the blow-by gas returning passage to detour the PCV valve; and an electrically-operated open-close valve placed in the bypass passage and configured to open and close.

13. An abnormality diagnosis device for diagnosing an abnormality of a blow-by gas returning apparatus configured to allow blow-by gas generated in an engine to flow to an intake passage and return to the engine,
the engine being configured to generate drive power when receiving supply of fuel, the supply of fuel being shut off during deceleration, the blow-by gas returning apparatus comprising:
- a blow-by gas storage unit configured to store blow-by gas generated in the engine;
- an intake amount regulating valve provided in the intake passage and configured to regulate an amount of intake air flowing in the intake passage;
- a blow-by gas returning passage configured to allow blow-by gas stored in the blow-by gas storage unit to flow in the intake passage downstream of the intake amount regulating valve and return to the engine;
- a gas flow regulating valve configured to regulate a flow rate of blow-by gas in the blow-by gas returning passage; and
- a fresh-air introduction passage configured to introduce fresh air into the blow-by gas storage unit, wherein the abnormality diagnosis device comprises:
- an intake amount detecting unit placed in the intake passage upstream of the intake amount regulating valve and configured to detect an amount of intake air;
- a communication passage for providing communication between the blow-by gas returning passage downstream of the gas flow regulating valve and the fresh-air introduction passage;
- an open-close valve placed in the communication passage; and
- an abnormality diagnosis unit configured to diagnose abnormality of the blow-by gas returning apparatus, and wherein the abnormality diagnosis unit is configured to:
- control the open-close valve to close and open when the engine is during deceleration and the supply of fuel to the engine is shut off, and
- diagnose the abnormality of the blow-by gas returning apparatus based on a valve-closed intake amount detected by the intake amount detecting unit when the open-close valve is closed and based on a valve-open intake amount detected by the intake amount detecting unit when the open-close valve is controlled to open.

* * * * *